United States Patent
Gupta et al.

(10) Patent No.: US 11,282,260 B2
(45) Date of Patent: Mar. 22, 2022

(54) BOUNDED VOLUME HIERARCHY (BVH) TREE TRAVERSAL USING SPATIAL DIVISION

(71) Applicant: QUALCOMM Incorporated, San Diego, CA (US)

(72) Inventors: Piyush Gupta, Bangalore (IN); Geetika Malhotra, Bangalore (IN); Pavan Kumar Akkaraju, Bangalore (IN)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 16/896,955

(22) Filed: Jun. 9, 2020

(65) Prior Publication Data

US 2021/0383591 A1 Dec. 9, 2021

(51) Int. Cl.
G06T 15/06 (2011.01)
G06T 17/00 (2006.01)
G06T 15/08 (2011.01)

(52) U.S. Cl.
CPC .............. *G06T 15/06* (2013.01); *G06T 15/08* (2013.01); *G06T 17/005* (2013.01); *G06T 2210/12* (2013.01)

(58) Field of Classification Search
None
See application file for complete search history.

(56) References Cited

U.S. PATENT DOCUMENTS

| 9,355,491 | B2 * | 5/2016 | Park | G06T 15/06 |
| 2009/0295800 | A1 * | 12/2009 | Vetter | G06T 15/08 345/424 |
| 2013/0016109 | A1 * | 1/2013 | Garanzha | G06F 12/0897 345/501 |
| 2014/0139534 | A1 * | 5/2014 | Tapply | G06T 15/005 345/522 |
| 2017/0249779 | A1 * | 8/2017 | Obert | G06T 15/06 |
| 2019/0318530 | A1 * | 10/2019 | Hunt | G06T 15/06 |

* cited by examiner

*Primary Examiner* — Nurun N Flora
(74) *Attorney, Agent, or Firm* — Seyfarth Shaw LLP

(57) ABSTRACT

A method is presented. The method includes organizing a scene as a number of bounding volumes in a hierarchical data structure. The method also includes generating a grid based on the hierarchical data structure. The method further includes mapping each node of the hierarchical data structure to at least one cell of the grid. The method additionally includes identifying a cell of the grid corresponding to an initial intersection location of a ray and the scene. The method still further includes determining a non-root node of the hierarchical data structure as a start node for traversing the hierarchical data structure based on the identified cell. The method also includes traversing the hierarchical data structure starting from the start node to identify a number a primitives intersected by the ray.

14 Claims, 15 Drawing Sheets

BOUNDED VOLUME HIERARCHY (BVH) TREE TRAVERSAL USING SPATIAL DIVISION

BACKGROUND

Field

Aspects of the present disclosure generally relate to ray tracing and more specifically, to methods and systems for accelerating bounded volume hierarchy (BVH) traversal for ray tracing.

Background

Ray tracing is a computer graphics technique to generate images by tracing paths of light through a three-dimensional scene, simulating interactions with objects illuminated by light sources, and finding ray-primitive, or ray-object intersections. A process for finding ray-primitive intersections may be improved by arranging a scene geometry in an acceleration data structure, or hierarchy, which groups scene primitives. Examples of acceleration data structures (hierarchies) include bounding volume hierarchy (BVH) trees, k-dimensional (KD) trees, and grids. Ray tracing methods traverse these hierarchies to determine ray-object intersections.

SUMMARY

According to an aspect of the present disclosure, a method, comprising organizing a scene as a number of bounding volumes in a hierarchical data structure. The method also generates a grid based on the hierarchical data structure. The method also maps each node of the hierarchical data structure to at least one cell of the grid. The method also identifies a cell of the grid corresponding to an initial intersection location of a ray and the scene. The method also determines a non-root node of the hierarchical data structure as a start node for traversing the hierarchical data structure based on the identified cell. The method further traverses the hierarchical data structure starting from the start node to identify a number a primitives intersected by the ray.

According to another aspect of the present disclosure, an apparatus for wireless communications includes a processor and a memory coupled with the processor. Instructions stored in the memory are operable, when executed by the processor, to cause the apparatus to organize a scene as a number of bounding volumes in a hierarchical data structure. The instructions also cause the apparatus to generate a grid based on the hierarchical data structure. The instructions also cause the apparatus to map each node of the hierarchical data structure to at least one cell of the grid. The instructions also cause the apparatus to identify a cell of the grid corresponding to an initial intersection location of a ray and the scene. The instructions also cause the apparatus to determine a non-root node of the hierarchical data structure as a start node for traversing the hierarchical data structure based on the identified cell. The instructions further cause the apparatus to traverse the hierarchical data structure starting from the start node to identify a number a primitives intersected by the ray.

According to further aspect of the present disclosure, an apparatus for wireless communications includes means for organizing a scene as a number of bounding volumes in a hierarchical data structure. The apparatus also includes means for generating a grid based on the hierarchical data structure. The apparatus also includes means for mapping each node of the hierarchical data structure to at least one cell of the grid. The apparatus also includes means for identifying a cell of the grid corresponding to an initial intersection location of a ray and the scene. The apparatus also includes means for determining a non-root node of the hierarchical data structure as a start node for traversing the hierarchical data structure based on the identified cell. The apparatus further includes means for traversing the hierarchical data structure starting from the start node to identify a number a primitives intersected by the ray.

According to another aspect of the present disclosure, a non-transitory computer readable medium storing program code for wireless communications by an apparatus includes program code to organize a scene as a number of bounding volumes in a hierarchical data structure. The apparatus also includes program code to generate a grid based on the hierarchical data structure. The apparatus also includes program code to map each node of the hierarchical data structure to at least one cell of the grid. The apparatus also includes program code to identify a cell of the grid corresponding to an initial intersection location of a ray and the scene. The apparatus also includes program code to determine a non-root node of the hierarchical data structure as a start node for traversing the hierarchical data structure based on the identified cell. The apparatus further includes program code to traverse the hierarchical data structure starting from the start node to identify a number a primitives intersected by the ray.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

Figure 1A:
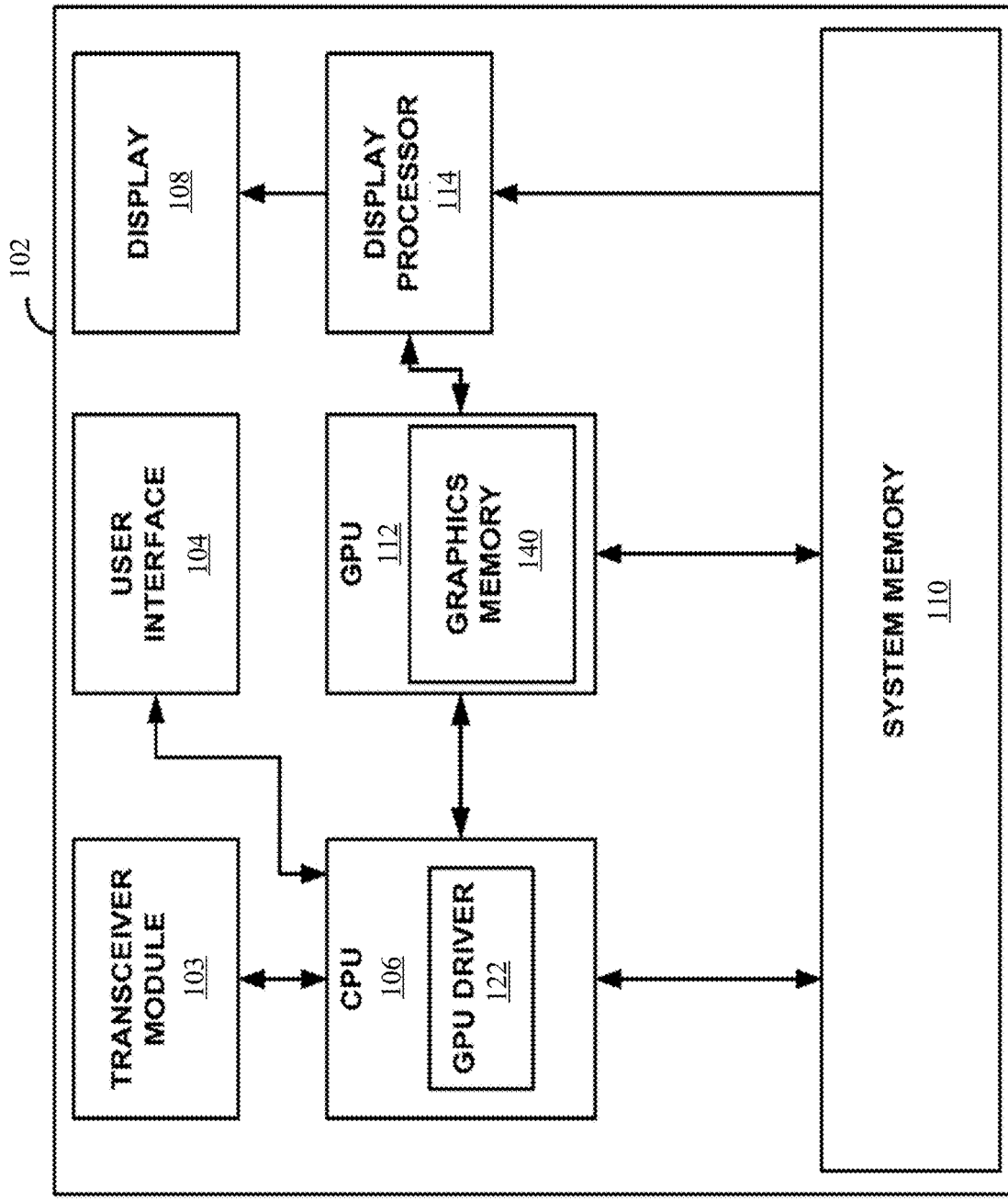
FIGS. 1A and 1B are block diagrams illustrating example computing devices for implementing one or more aspects of this disclosure.

The detailed description set forth below, in connection with the appended drawings, is intended as a description of various configurations and is not intended to represent the only configurations in which the concepts described may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Based on the teachings, one skilled in the art should appreciate that the scope of the disclosure is intended to cover any aspect of the disclosure, whether implemented independently of or combined with any other aspect of the disclosure. For example, an apparatus may be implemented or a method may be practiced using any number of the aspects set forth. In addition, the scope of the disclosure is intended to cover such an apparatus or method practiced using other structure, functionality, or structure and functionality in addition to or other than the various aspects of the disclosure set forth. It should be understood that any aspect of the disclosure disclosed may be embodied by one or more elements of a claim.

The word "exemplary" is used to mean "serving as an example, instance, or illustration." Any aspect described as "exemplary" is not necessarily to be construed as preferred or advantageous over other aspects.

Although particular aspects are described, many variations and permutations of these aspects fall within the scope of the disclosure. Although some benefits and advantages of the preferred aspects are mentioned, the scope of the disclosure is not intended to be limited to particular benefits, uses or objectives. Rather, aspects of the disclosure are intended to be broadly applicable to different technologies, system configurations, networks and protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Ray tracing is a computer graphics technique in which rays (defined by their origins and directions) are traced through sets of scene primitives to identify ray-object intersections. Ray tracers use acceleration data structures (hierarchies) to characterize spatial or geometrical relationships of objects in scenes. Some implementations use bounding volume hierarchy (BVH) trees as an acceleration data structure. The BVH includes a root node at the top of the hierarchy, interior nodes that represent bounded regions of space, and leaf nodes that represent primitives. In some aspects, a surface area heuristic (SAH) provides a directive for splitting bounding boxes to reduce traversal hops. Acceleration data structures may organize a 3D scene to improve ray traversal, for example, a region may be bounded by axis-aligned bounding boxes (AABBs). The computational complexity of traversing a BVH tree and conducting ray-object intersection tests may be logarithmic with respect to the number of nodes in the tree.

Rendering a single image with ray tracing may require millions of ray/object intersection tests. Substantial reductions in the number of intersection tests may reduce an image rendering time. Conventional acceleration data structure traversal functions begin at a root node of the tree (e.g., of the hierarchy) and traverse the tree to cover the volume of space of the scene. Acceleration data structure traversal functions may be improved by traversing only a portion of a tree, rather than the entire tree. These approaches may be applied to BVH trees, KD-trees, or other tree structures.

Aspects of the present disclosure are directed to traversal functions for traversing a portion of the tree instead of the entire tree. In some implementations, the traversal function identifies a non-root start node for initiating the traversal process of the acceleration data structure. Initiating the traversal process at a non-root node instead of the root node may reduce a number of intersection tests, thereby, reducing the image rendering time and reducing the use of system resources (e.g., processor load and memory use).

FIG. 1A is a block diagram illustrating an example computing device that may be configured to implement one or more aspects of this disclosure. As shown in FIG. 1A, a device 102 may be a computing device including but not limited to video devices, media players, set-top boxes, wireless handsets such as mobile telephones and smartphones, personal digital assistants (PDAs), desktop computers, laptop computers, gaming consoles, video conferencing units, tablet computing devices, and the like. In the example of FIG. 1A, the device 102 may include a central processing unit (CPU) 106, a system memory 110, and a graphics processing unit (GPU) 112. The device 102 may also include a display processor 114, a transceiver module 103, a user interface 104, and a display 108. The transceiver module 103 and the display processor 114 may be part of a same integrated circuit (IC) as the CPU 106 and/or the GPU 112, may be external to the IC or ICs that include the CPU 106 and/or the GPU 112, or may be formed in the IC that is external to the IC including the CPU 106 and/or the GPU 112.

The device 102 may include additional modules or units not shown in FIG. 1A for purposes of clarity. For example, the device 102 may include a speaker and a microphone, neither of which are shown in FIG. 1A, to effectuate telephonic communications in examples where the device 102 is a mobile wireless device, or a speaker where the device 102 is a media player. The device 102 may also include a video camera. Furthermore, the various modules and units shown in the device 102 may not be necessary in every example of the device 102. For example, a user interface 104 and a display 108 may be external to the device 102 in examples where the device 102 is a desktop computer or other device that is equipped to interface with an external user interface or display.

Examples of the user interface 104 include, but are not limited to, a trackball, a mouse, a keyboard, and other types of input devices. The user interface 104 may also be a touch screen and may be incorporated as a part of the display 108. The transceiver module 103 may include circuitry to allow wireless or wired communication between the device 102 and another device or a network. The transceiver module 103 may include modulators, demodulators, amplifiers, and other such circuitry for wired or wireless communications.

The CPU 106 may be a microprocessor, such as a central processing unit (CPU) configured to process instructions of a computer program for execution. The CPU 106 may comprise a general-purpose or a special-purpose processor that controls operation of the device 102. A user may provide input to the device 102 to cause the CPU 106 to execute one or more software applications. The software applications that execute on the CPU 106 may include, for example, an operating system, a word processor application, an email application, a spreadsheet application, a media player application, a video game application, a graphical user interface application or another program. Additionally, the CPU 106 may execute the GPU driver 122 for controlling the operation of the GPU 112. The user may provide input to the device 102 via one or more input devices (not shown) such as a keyboard, a mouse, a microphone, a touchpad or another input device that is coupled to the device 102 via the user interface 104.

The software applications that execute on the CPU 106 may include one or more graphics rendering instructions that instruct the CPU 106 to cause the rendering of graphics data to the display 108. In some examples, the software instructions may conform to a graphics application programming interface (API), such as, e.g., an Open Graphics Library (OpenGL®) API, an Open Graphics Library Embedded Systems (OpenGL ES) API, a Direct3D API, an X3D API, a RenderMan API, a WebGL API, or any other public or proprietary standard graphics API. In order to process the graphics rendering instructions, the CPU 106 may issue one or more graphics rendering commands to the GPU 112 (e.g., through a GPU driver 122) to cause the GPU 112 to perform some or all of the rendering of the graphics data. In some examples, the graphics data to be rendered may include a list of graphics primitives, e.g., points, lines, triangles, quadrilaterals, triangle strips, etc.

The GPU 112 may be configured to perform graphics operations to render one or more graphics primitives to the display 108. Thus, when one of the software applications executing on the CPU 106 calls for graphics processing, the CPU 106 may provide graphics commands and graphics data to the GPU 112 for rendering to the display 108. The graphics data may include, for example, drawing commands, state information, primitive information, and/or texture information. The GPU 112 may, in some instances, be built with a highly-parallel structure that provides more improved processing of complex graphic-related operations in comparison to the CPU 106. For example, the GPU 112 may include multiple processing elements, such as shader units, for operating on multiple vertices or pixels in a parallel manner. The parallel nature of the GPU 112 may, in some instances, allow the GPU 112 to draw graphics images (e.g., GUIs and two-dimensional (2D) and/or three-dimensional (3D) graphics scenes) onto the display 108 more quickly than drawing the scenes directly to display 108 using the CPU 106.

The GPU 112 may, in some instances, be integrated into a motherboard of the device 102. In other instances, the GPU 112 may be present on a graphics card installed in a port in the motherboard of the device 102 or may be otherwise incorporated within a peripheral device configured to interoperate with the device 102. The GPU 112 may include one or more processors, such as one or more microprocessors, application specific integrated circuits (ASICs), field programmable gate arrays (FPGAs), digital signal processors (DSPs), or other equivalent integrated or discrete logic circuitry. The GPU 112 may also include one or more processor cores, such that the GPU 112 may be referred to as a multi-core processor.

The GPU 112 may be directly coupled to graphics memory 140. Thus, the GPU 112 may read data from and write data to graphics memory 140 without using a bus. In other words, the GPU 112 may process data locally using local storage, instead of off-chip memory. Such graphics memory 140 may be referred to as on-chip memory. This allows the GPU 112 to operate in a more efficient manner by eliminating reads and writes via a bus. In some instances, however, the GPU 112 may not include a separate memory, but instead, use system memory 110 via a bus. Graphics memory 140 may include one or more volatile or non-volatile memories or storage devices, such as, for example, random access memory (RAM), static RAM (SRAM), dynamic RAM (DRAM), erasable programmable ROM (EPROM), electrically erasable programmable ROM (EEPROM), flash memory, a magnetic data media or an optical storage media.

In some examples, the GPU 112 may store a fully formed image in system memory 110. A display processor 114 may retrieve the image from the system memory 110 and output values that cause pixels of the display 108 to illuminate to display the image. The display 108 may be the display of the device 102 that displays the image content generated by the GPU 112. The display 108 may be a liquid crystal display (LCD), an organic light emitting diode display (OLED), a cathode ray tube (CRT) display, a plasma display, or another type of display device.

In accordance with aspects of the present disclosure, the GPU 112 may organize multiple primitives in a hierarchical data structure. The GPU 112 may map nodes of the hierarchical data structure to cells of a grid. The GPU 112 may identify an interior non-root node of the hierarchical data structure as a start node in the hierarchical data structure to start traversal of the hierarchical data structure. The GPU 112 may traverse the hierarchical data structure starting from the start node to determine the primitive that is intersected by the ray. Aspects of the present disclosure may also be implemented as software.

Figure 1B:
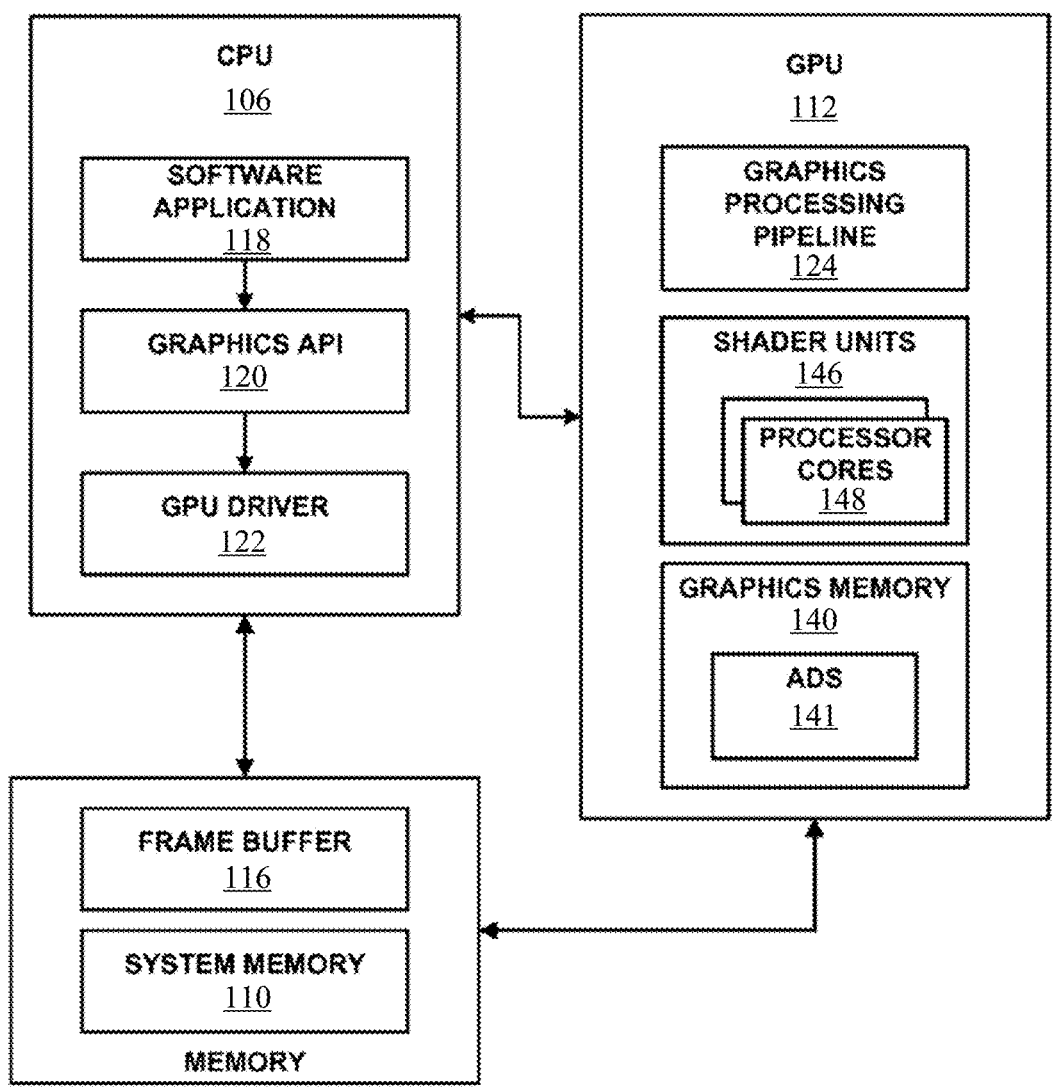

FIG. 1B is a block diagram illustrating example implementations of the CPU 106, the GPU 112, and the system memory 110 of FIG. 1A in further detail. As shown in FIG. 1B, the CPU 106 may include a software application 118, a graphics API 120, and a GPU driver 122, each of which may be one or more software applications or services that execute on the CPU 106.

Memory available to the CPU 106 and the GPU 112 may include a system memory 110 and a frame buffer 116. The frame buffer 116 may be a part of the system memory 110 or may be separate from the system memory 110. The frame buffer 116 may store rendered image data.

A software application 118 may be any application that uses functions of the GPU 112. For example, the software application 118 may be a GUI application, an operating system, a portable mapping application, a computer-aided design program for engineering or artistic applications, a video game application, or another type of software application that uses 2D or 3D graphics.

The software application 118 may include one or more drawing instructions that instruct the GPU 112 to render a graphical user interface (GUI) and/or a graphics scene. For example, the drawing instructions may include instructions that define a set of one or more graphics primitives to be rendered by the GPU 112. In some examples, the drawing instructions may, collectively, define all or part of windowing surfaces used in a GUI. In additional examples, the drawing instructions may, collectively, define all or part of a graphics scene that includes one or more graphics objects within a model space or world space defined by the application.

The software application 118 may invoke the GPU driver 122, via the graphics API 120, to issue one or more commands to the GPU 112 for rendering one or more graphics primitives into displayable graphics images. For example, the software application 118 may invoke the GPU driver 122, via the graphics API 120, to provide primitive definitions to the GPU 112. In some instances, the primitive definitions may be provided to the GPU 112 in the form of a list of drawing primitives, such as, triangles, rectangles, triangle fans, and/or triangle strips. The primitive definitions may include vertex specifications that specify one or more vertices associated with the primitives to be rendered. The vertex specifications may include positional coordinates for each vertex and, in some instances, other attributes associated with the vertex, such as, color coordinates, normal vectors, and texture coordinates. The primitive definitions may also include primitive type information (e.g., triangle, rectangle, triangle fan, triangle strip, etc.), scaling information, rotation information, and the like. Based on the instructions issued by the software application 118 to the GPU driver 122, the GPU driver 122 may formulate one or more commands that specify one or more operations for the GPU 112 to perform in order to render the primitive. When the GPU 112 receives a command from the CPU 106, a graphics processing pipeline 124 decodes the command and configures the graphics processing pipeline 124 to perform the operation specified in the command. For example, an input-assembler 126 in the graphics processing pipeline 124 may read primitive data and assemble the data into primitives for use by the other graphics pipeline stages in a graphics processing pipeline 124. After performing the specified operations, the graphics processing pipeline 124 outputs the rendered data to the frame buffer 116 associated with a display device.

The frame buffer 116 stores destination pixels for the GPU 112. Each destination pixel may be associated with a unique screen pixel location. In some examples, the frame buffer 116 may store color components and a destination alpha value for each destination pixel. For example, the frame buffer 116 may store red, green, blue, alpha (RGBA) components for each pixel where the "RGB" components correspond to color values, and the "A" component corresponds to a destination alpha value. Although the frame buffer 116 and system memory 110 are illustrated as being separate memory units, in other examples, the frame buffer 116 may be part of system memory 110.

In some examples, the graphics processing pipeline 124 may include one or more of a vertex shader stage, a hull shader stage, a domain shader stage, a geometry shader stage, and a pixel shader stage. These stages of graphics processing pipeline 124 may be considered shader stages. These shader stages may be implemented as one or more shader programs that execute on the shader units 146 in the GPU 112. The shader units 146 may be configured as a programmable pipeline of processing components. In some examples, the shader units 146 may be referred to as shader processors or unified shaders, and may perform geometry, vertex, pixel, or other shading operations to render graphics. The shader units 146 may include processor cores 148, each of which may include one or more components for fetching and decoding operations, one or more arithmetic logic units for carrying out arithmetic calculations, one or more memories, caches, and registers.

The GPU 112 may designate the shader units 146 to perform a variety of shading operations such as vertex shading, hull shading, domain shading, geometry shading, pixel shading, and the like by sending commands to the shader units 146 to execute one or more of a vertex shader stage, a hull shader stage, a domain shader stage, a geometry shader stage, and a pixel shader stage in the graphics processing pipeline 124. In some examples, the GPU driver 122 may be configured to compile one or more shader programs, and to download the compiled shader programs onto one or more programmable shader units contained within the GPU 112. The shader programs may be written in a high level shading language, such as, e.g., an OpenGL shading language (GLSL), a high level shading language (HLSL), a C for graphics (Cg) shading language, etc. The compiled shader programs may include one or more instructions that control the operation of the shader units 146 within the GPU 112. For example, the shader programs may include vertex shader programs that may be executed by the shader units 146 to perform the functions of a vertex shader stage, hull shader programs that may be executed by the shader units 146 to perform the functions of a hull shader stage, domain shader programs that may be executed by the shader units 146 to perform the functions of a domain shader stage, geometry shader programs that may be executed by the shader units 146 to perform the functions of a geometry shader stage and/or pixel shader programs that may be executed by the shader units 146 to perform the functions of a pixel shader. A vertex shader program may control the execution of a programmable vertex shader unit or a unified shader unit, and include instructions that specify one or more per-vertex operations.

A graphics memory 140 is on-chip storage or memory physically integrated into the integrated circuit of the GPU 112. Because the graphics memory 140 is on-chip, the GPU 112 may be able to read values from or write values to the graphics memory 140 more quickly than reading values from or writing values to system memory 110 via a system bus. In some examples, the ADS 141 may be stored in the system memory 110, in a shader memory (not shown) of the shader units 146 or in a shared system/graphics memory (not shown).

In accordance with aspects of the present disclosure, the GPU 112 may organize primitives in the ADS 141. The GPU 112 may map nodes of the ADS 141 to cells of a grid. The GPU 112 may determine a non-root node of the ADS 141 as a start node in the ADS 141 to start traversal of the ADS 141. The GPU 112 may traverse the ADS 141 starting from the start node to determine the primitive that is intersected by the ray.

Figure 2A:
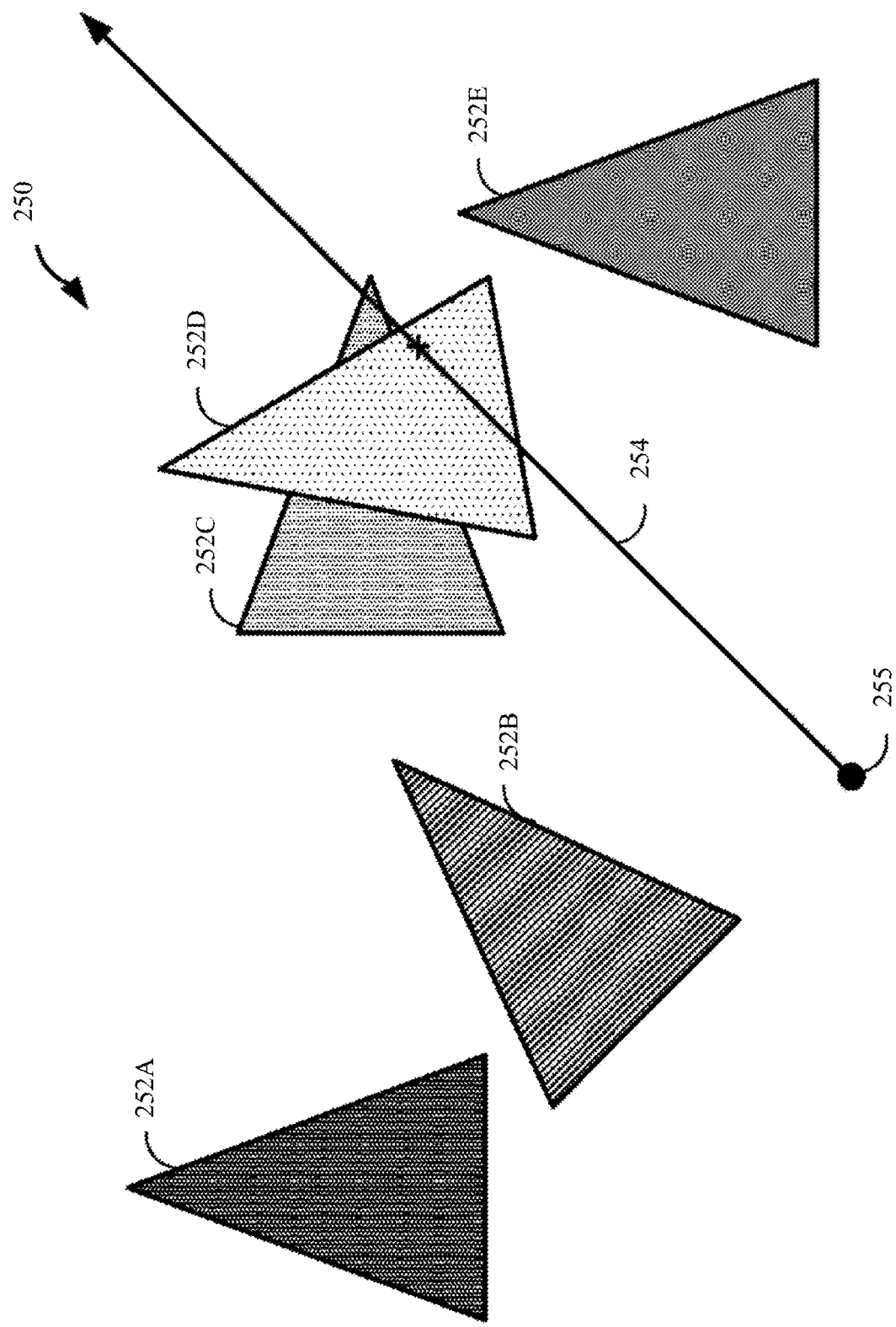
FIG. 2A is a block diagram illustrating an example scene for ray tracing, in accordance with aspects of the present disclosure.

FIG. 2A is a block diagram illustrating an example scene onto which the GPU 112 may perform ray tracing. As shown in FIG. 2A, a scene 250 may be a 2D or 2D scene that includes primitives 252A-252E (e.g., primitives 252). As part of the ray tracing process, the GPU 112 may determine, for a ray 254, which may be a 2D ray, and which emanates from a source 255, the primitives in the primitives 252 of the scene 250 that are intersected by the ray 254.

Figure 2B:
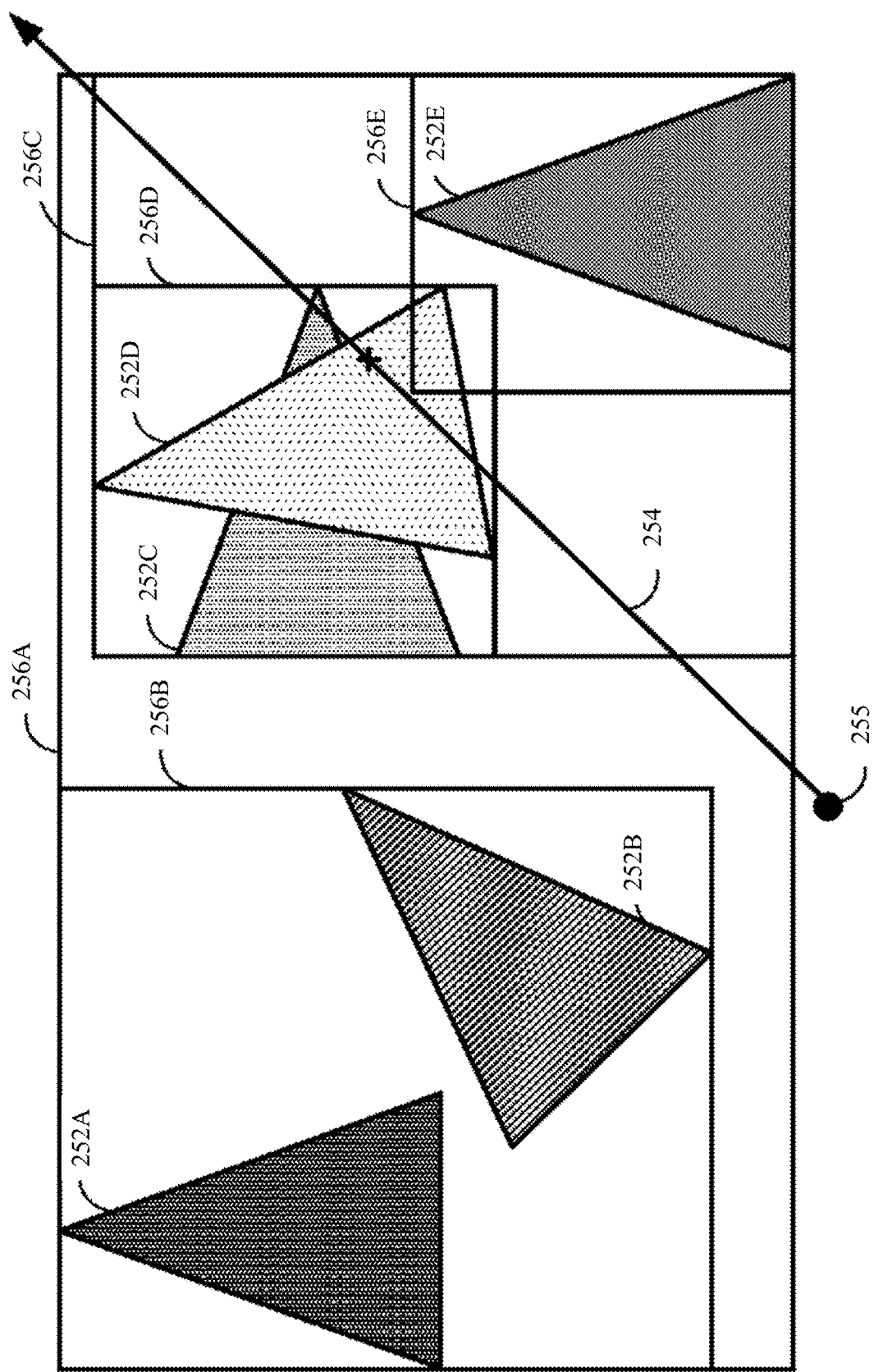
FIG. 2B is a block diagram illustrating scene partitioning, in accordance with aspects of the present disclosure.

The GPU 112 may determine the primitive(s) in the primitives 252 that is intersected by the ray 254 by dividing the scene 250, hierarchically arranging the divided portions of the scene 250, and recursively traversing the hierarchy of the divided portions of the scene 250. FIG. 2B is a block diagram illustrating partitioning the scene 250 into bounding volumes. As shown in FIG. 2B, the GPU 112 may conceptually partition the primitives 252 into bounding volumes 256A-256E (e.g., bounding volumes 256). The bounding volumes 256 may be bounding boxes, such as axis-aligned bounding boxes (AABBs), or other types of bounding boxes. AABBs are examples of bounding boxes that minimize an area that all points of the enclosed primitives may lie. Additionally, the bounding boxes may be axis-aligned such that the edges of the boxes may be parallel to the coordinate axis (e.g., the x, y, and z axes).

The first bounding volume 256A may be a bounding box that bounds all primitives 252 of scene 250. Second and third bounding volumes 256B and 256C may be subsets of the first bounding volume 256A in that the second and third bounding volumes 256B and 256C bound a subset of the portion of scene 250 bound by the first bounding volume 256A. The second bounding volume 256B may bound primitives 252A and 252B, and the third bounding volume 256C may bound primitives 252C, 252D, and 252E. The fourth and fifth bounding volumes 256D and 256E may be subsets of the third bounding volume 256C, and may bound a subset of the portion of scene 250 bound by the second bounding volume 256B. The fourth bounding volume 256D may bound primitives 252C and 252D, and the fifth bounding volume 256E may bound fifth primitive 252E.

In the example shown in FIG. 2B, the GPU 112 may partition the primitives 252 into five bounding volumes 256. The GPU 112 may use more than or fewer than five bounding volumes 256. For example, the GPU 112 may create additional bounding volumes as subsets of the second bounding volume 256B to individually bound the primitives 252A and 252B, respectively. In some examples, the CPU 106 may also be configured to partition the primitives 252 into bounding volumes 256.

Figure 3:
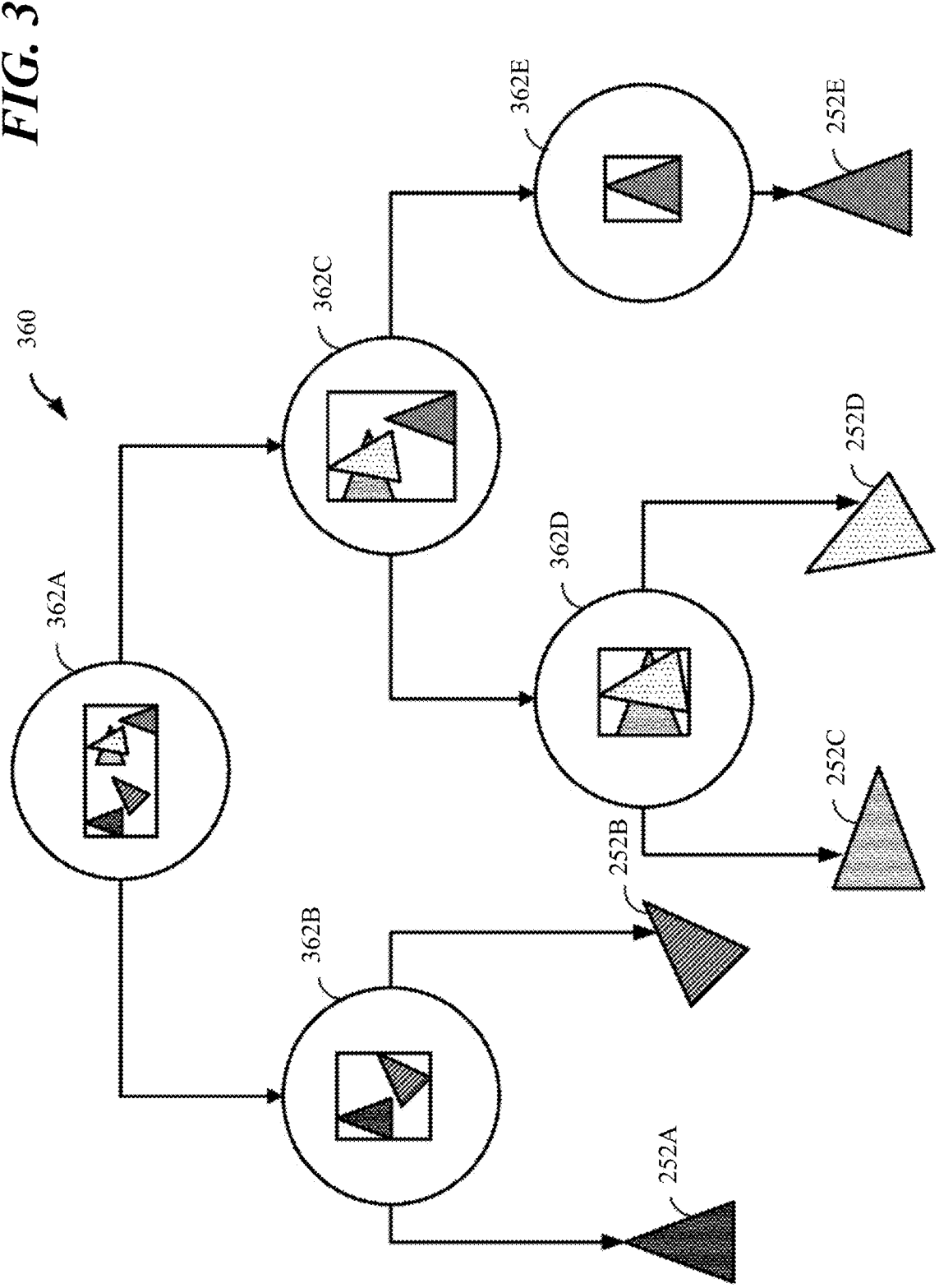
FIG. 3 illustrates an example hierarchical data structure, in accordance with aspects of the present disclosure.

FIG. 3 illustrates an example hierarchical data structure having nodes associated with the bounding volumes 256 and the primitives 252 shown in FIG. 2B. As discussed above, scene primitives of a scene may be organized into the ADS 141, and the ADS 141 may be traversed to determine a ray-primitive intersection. The GPU 112 may store the ADS 141 in graphics memory 140. As shown in FIG. 3, the bounding volumes 256 and the primitives 252 may be associated with nodes of the ADS 141, such as a bounding volume hierarchy (BVH) tree 360, which is associated with the scene 250. The GPU 112 or CPU 106 may construct the BVH tree 360 such that it may include the nodes 362A-362E (e.g., nodes 362) associated with the bounding volumes 256 and the primitives 252 in the scene 250. More specifically, a first node 362A (e.g., root node), an interior third node 362C, and leaf nodes 362B, 362D, and 362E may each be associated with a bounding volume of the bounding volumes 256. Nodes of the BVH tree 360 other than the root first node 362A may be referred to as non-root nodes of the BVH tree 360. For example, the interior third node 362C and the leaf nodes 362B, 362D, and 362E may be referred to as non-root nodes of the BVH tree 360. Leaf nodes 362B, 362D, and 362E may each be linked with at least one primitive of the primitives 252. For example, a second leaf node 362B may be linked with the first and second primitives 252A and 252B, a fourth leaf node 362D may be linked with the third and fourth primitives 252C and 252D, and a third leaf node 362E may be linked with the fifth primitive 252E. The BVH tree 360 may be considered an unbalanced binary tree because each non-leaf node of the BVH tree 360 has at most two child nodes, and because leaf nodes 362B, 362D, and 362E may have unequal depths.

Because the first bounding volume 256A bounds all primitives 252 of the scene 250, the GPU 112 may associate the root first node 362A with the first bounding volume 256A. The GPU 112 may associate other nodes 362B and 362C, which are child nodes of the root first node 362A, with the second and third bounding volumes 256B and 256C, respectively, because the second and third bounding volumes 256B and 256C are each subsets of the first bounding volume 256A. The GPU 112 may link the first and second primitives 252A and 252B with the second node 362B, because the second bounding volume 256B associated with the second node 362B bounds the first and second primitives 252A and 252B, and because there are no additional bounding volumes that are subsets of the second bounding volume 256B.

The GPU 112 may associate the fourth and fifth bounding volumes 256D and 256E with the nodes 362D and 362E, which are child nodes of the third node 362C, because the fourth and fifth bounding volumes 256D and 256E are each subsets of the third bounding volume 256C associated with the third node 362C. The GPU 112 may link the third and fourth primitives 252C and 252D with the fourth node 362D, because the fourth bounding volume 256D associated with the fourth node 362D bounds the third and fourth primitives 252C and 252D, and because there are no additional bounding volumes that are subsets of the fourth bounding volume 256D. The GPU 112 may also link the fifth primitive 252E with the fifth node 362E, because the fifth bounding volume 256E associated with the fifth node 362E bounds the fifth primitive 252E, and because there are no additional bounding volumes that are subsets of the fifth bounding volume 256E.

In conventional systems, the GPU 112 may traverse the BVH tree 360 to determine the primitive(s) of primitive 252 that intersects the ray 254 by performing ray-box intersection tests for the bounding volumes 256 associated with the nodes 362 of the BVH tree 360. In conventional systems, the GPU 112 may start traversal of the BVH tree 360 by performing a ray-box intersection test for the first bounding volume 256A associated with the first node 362A (e.g., root node). If the GPU 112 determines that the ray 254 intersects bounded volume 256A, the GPU 112 may continue to traverse the BVH tree 360 to the second leaf node 362B, and the GPU 112 may perform a ray-box intersection test for the second bounding volume 256B associated with the second leaf node 362B. If the GPU 112 determines the ray 254 does not intersect the second bounded volume 256B, the GPU 112 may recursively traverse the BVH 360 tree up to the first node 362A and down to the third leaf node 362C, and the GPU 112 may perform a ray-box intersection test for the third bounding volume 256C associated with the third leaf node 362C. If the GPU 112 determines that the ray 254 intersects the third bounded volume 256C, the GPU 112 may continue to traverse the BVH tree 360 to the fourth leaf node 362D, and the GPU 112 may perform a ray-box intersection test for the fourth bounding volume 256D associated with the fourth leaf node 362D. If the GPU 112 determines the ray 254 intersects the fourth bounded volume 256D, the GPU 112 may perform a ray-primitive intersection test for primitives linked to the fourth leaf node 362D. Therefore, the GPU 112 may perform a ray-primitive intersection test for the third primitive 252C and may also perform a ray-primitive intersection test for the fourth primitive 252D. The GPU 112 may determine from the ray-primitive intersection test for the fourth primitive 252D that the ray 254 intersects the fourth primitive 252D. After the GPU 112 determines the ray 254 intersects the fourth primitive 252D, the GPU 112 may continue to recursively traverse the BVH tree 360 up to the third leaf node 362C and down to the fifth leaf node 362E, and the GPU 112 may perform a ray-box intersection test for the fifth bounding volume 256E associated with the node 362E. The GPU 112 may determine, based on the ray-box intersection test, that the ray 254 does not intersect the fifth bounding volume 256E, thereby ending traversal of the BVH tree 360 for the ray 254.

If the BVH tree 360 is traversed starting from a non-root node, such as the third leaf node 362C or the leaf nodes 362B, 362D, and 362E, the GPU 112 may reduce the number of ray intersection tests performed relative to starting traversal of the BVH tree 360 from the root first node 362A, thereby increasing the efficiency of determining a primitive intersected by a ray. In some implementations, the GPU 112 may map nodes 362 of the BVH tree 360 to cells of a grid. The GPU 112 may traverse the BVH tree 360 from a non-root node 362 by tracing the ray through the grid. The traversal may be performed from the nodes 362 mapped to the cells.

Aspects of the present disclosure accelerate the BVH tree traversal to reduce memory fetches and computation overhead. A multi-step procedure may accelerate the BVH tree traversal. In one configuration, a grid map is constructed during a construction pass of the BVH tree. As an example, each BVH node may be mapped to a cell of the grid. After constructing the grid map, the grid map may be traversed during a BVH traversal pass. As an example, the ray may be traced through the grid and the BVH traversal may be performed from the mapped BVH nodes. That is, the BVH traversal may start at an interior node rather than starting at a root node.

A grid may be an example of a spatial sub-division acceleration structure for ray tracing. In a grid, a scene is divided into uniforms cells. Subsets of primitives are associated with cells in the grid. A ray may be traversed through the cells along its path to find the ray-primitive intersection. Associated primitives are fetched from the visiting cell and tested for intersection.

Figure 4:
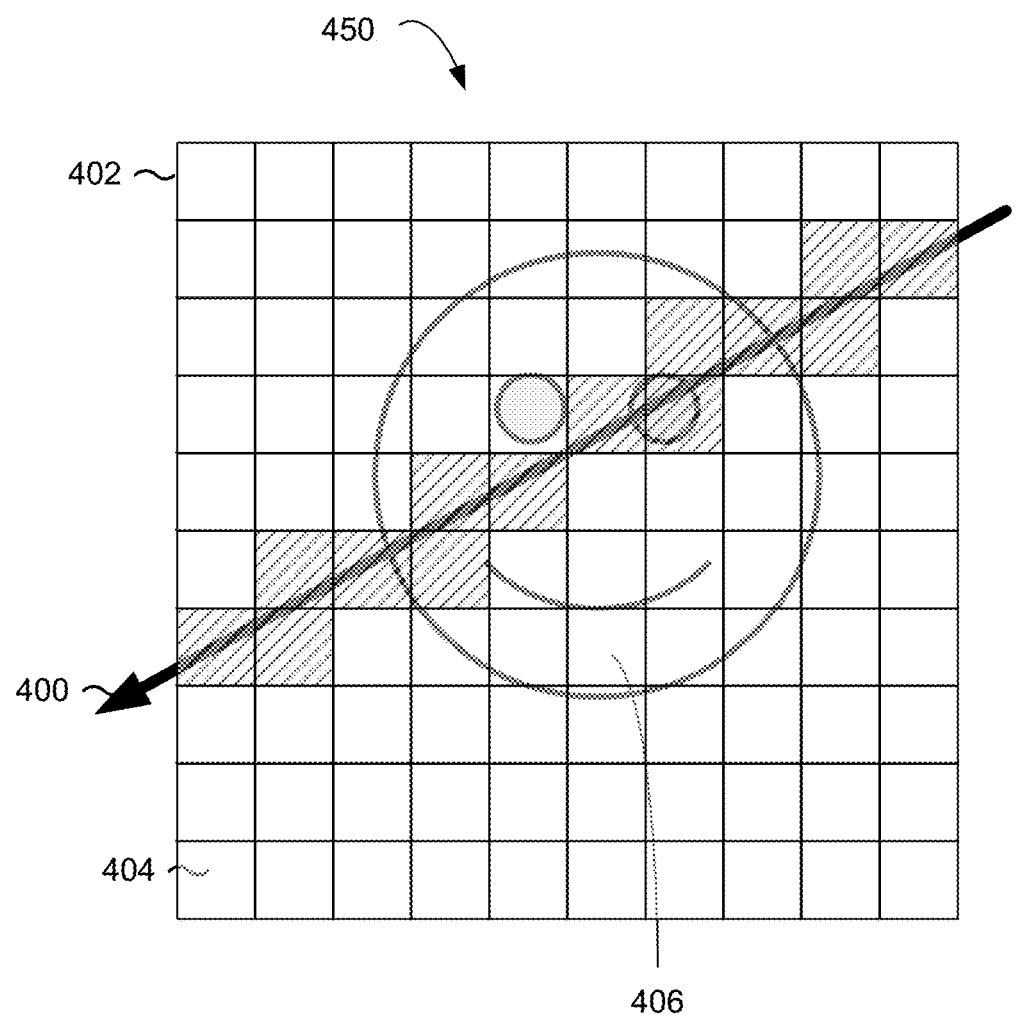
FIG. 4 illustrates an example of ray tracing, in accordance with aspects of the present disclosure.

FIG. 4 illustrates an example of a ray 400 traversing a grid 402 according to aspects of the present disclosure. As shown in FIG. 4, a scene 450 is divided into uniforms cells 404. The scene includes a head 406 and an environment surrounding the head 406. Different portions of the head 406 (e.g., subsets of the primitives) may be associated with different cells 404 in the grid 402. The ray 400 may be traversed through the cells 404 along its path to find the ray-primitive intersection. In FIG. 4, the path of the ray 400 is indicated via shaded cells 404. Associated primitives are fetched from cells 404 in the path of the ray 400 and tested for intersection.

As described, aspects of the present disclosure provide a grid construction function for mapping each cell of a grid mapped to a BVH tree node. A mapped BVH node has an increased probability of including a nearest ray-primitive intersection point. The grid construction may be performed after a BVH construction phase. The mapping may be updated in response to changes to a structure of the BVH.

Figure 5:
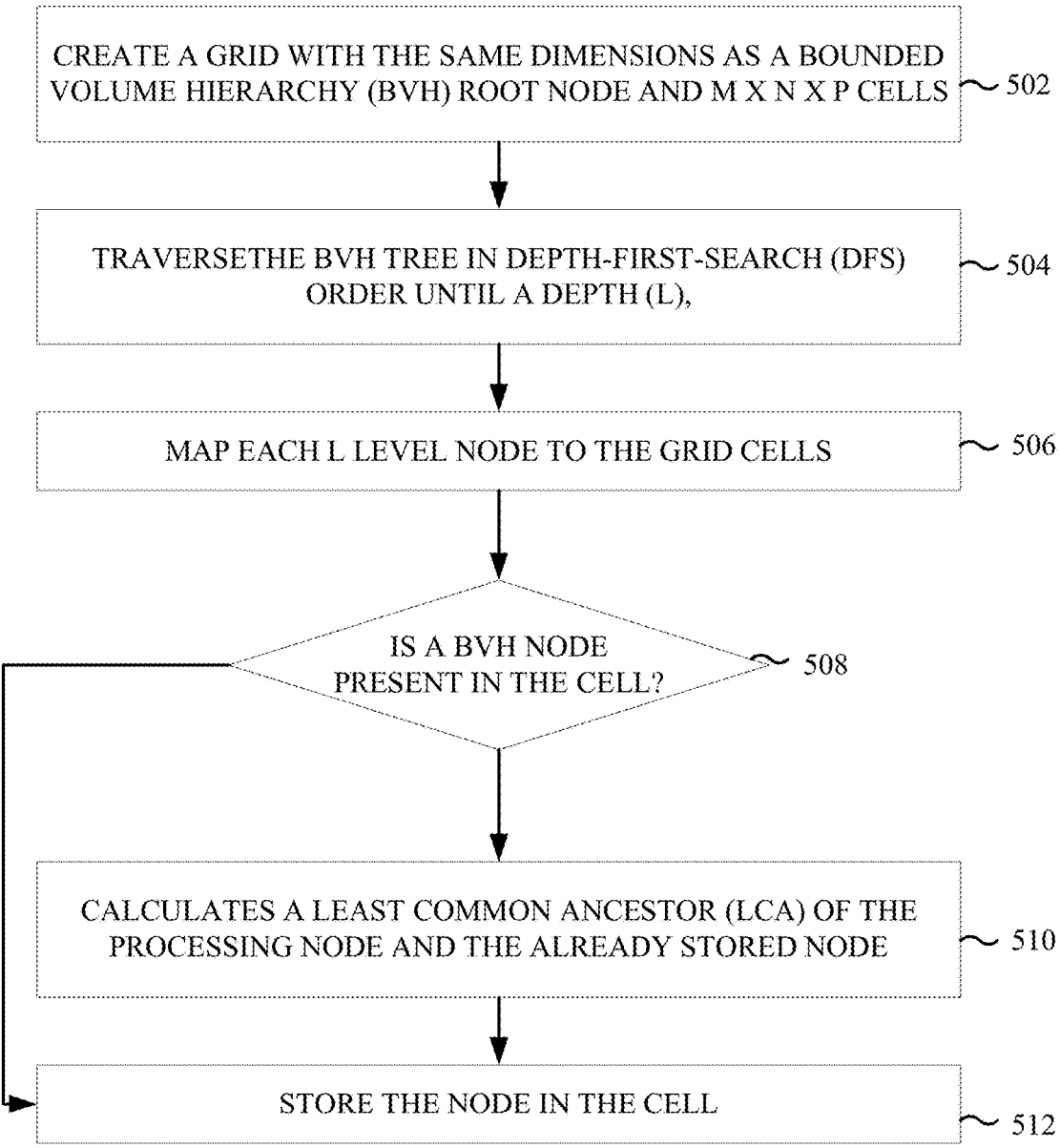
FIG. 5 illustrates a flow diagram for a grid map construction process, in accordance with aspects of the present disclosure.

FIG. 5 illustrates a flow diagram for a grid construction process 500 according to aspects of the present disclosure. As shown in FIG. 5, at block 502, a grid is created with the same dimensions as a BVH root node and M×N×P cells. That is, the grid dimensions may be equal to a bounding box of the root node of the BVH tree. In some aspects, the grid may be a three-dimensional grid with a width (W), height (H), and depth (D) in X, Y, and Z directions. The grid may include M, N, and P cells in the X, Y, and Z directions. The cell width ($C_w$), cell height ($C_h$) and, cell depth ($C_d$) may be determined as follows:

$$C_w = W/M \quad (1)$$

$$C_h = H/N \quad (2)$$

$$C_d = D/P \quad (3)$$

After generating the grid, at block 504, the BVH tree is traversed in depth-first-search (DFS) order until a depth (L), where L is a maximum BVH tree depth level for mapping BVH nodes. At block 506, each L level node is mapped to grid cells. When mapping the L level node to a grid cell, at block 508, the process determines if a BVH node is already present in the cell. If a BVH node is not present, the node is stored in the cell (512). If a BVH node is already present, the process 500 calculates a least common ancestor (LCA) of the processing node and the already stored node (block 510). The LCA may be associated with the cell. The node may then be stored in the cell (block 512).

Figure 6:
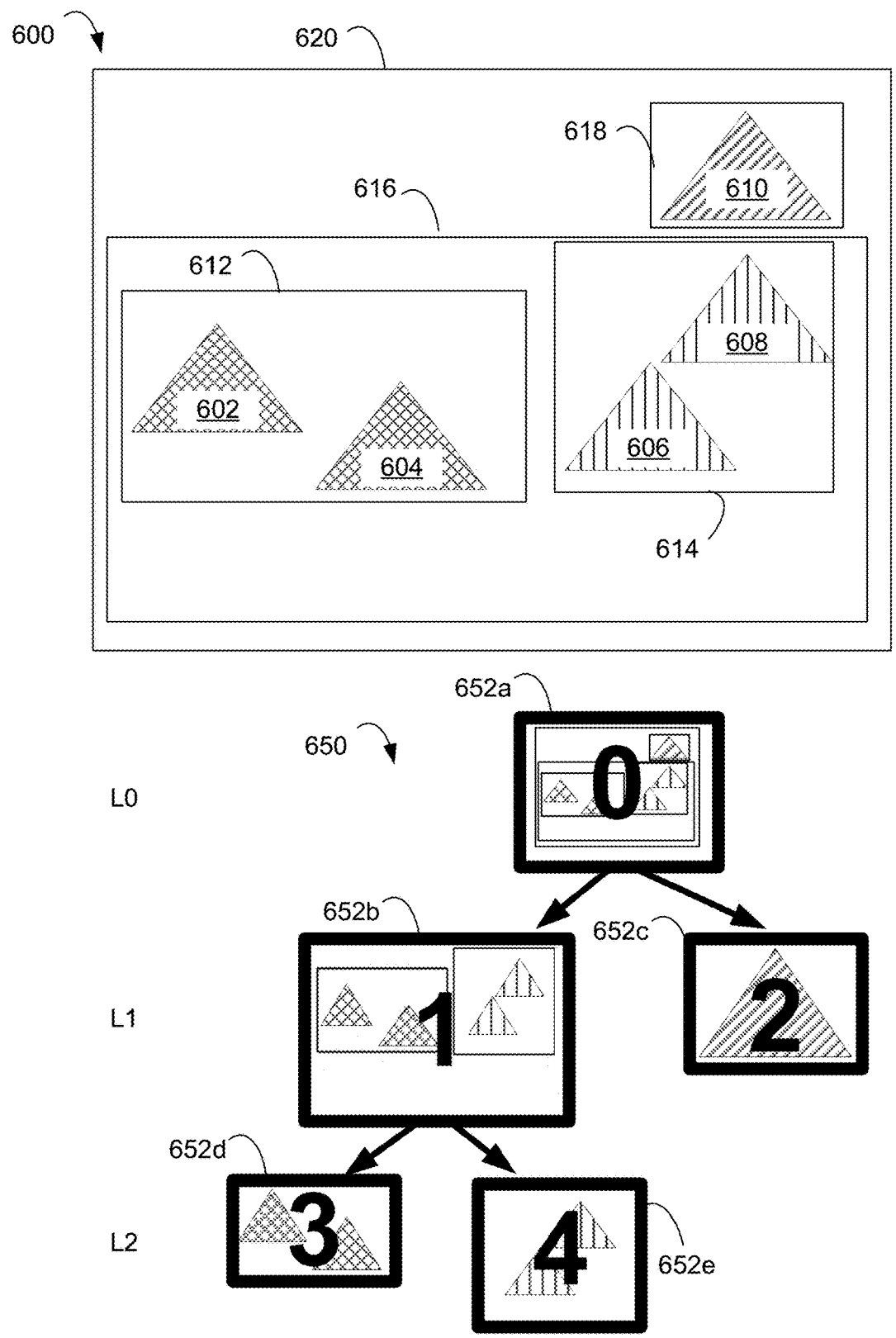
FIG. 6 illustrates an example of a grid map construction process, in accordance with aspects of the present disclosure.

FIG. 6 illustrates an example of a scene 600 and a corresponding BVH tree 650. The process for constructing the BVH tree 650 from the scene 600 is similar to the process for constructing the BVH tree 360 from the scene 250 as described in FIGS. 2A, 2B, and FIG. 3. As shown in FIG. 6, the scene 600 includes primitives represented as triangles 602, 604, 606, 608, and 610. In FIG. 6, a depth level of the BVH tree 650 is two (e.g., L2). The first and second triangles 602 and 604 are bound by a first bounding box 612 corresponding to a third node 652d (e.g., node 3) of the BVH tree 650. Additionally, the third and fourth triangles 606 and 608 are bound by a second bounding box 614 corresponding to a fourth node 652e (e.g., node 4) of the BVH tree 650. As shown in FIG. 6, the first, second, third, and fourth triangles 602, 604, 606, and 608 are all bound by a third bounding box 616 corresponding to a first node 652b (e.g., node 1) of the BVH tree 650. Furthermore, the sixth triangle 610 is bound by a fourth bounding box 618 corresponding to a second node 652c (e.g., node 2) of the BVH tree 650. Finally, the entire scene 600 is bound by a fifth bounding box 620 corresponding to a root node 652a (e.g., node 0) of the BVH tree 650.

Figure 7A:
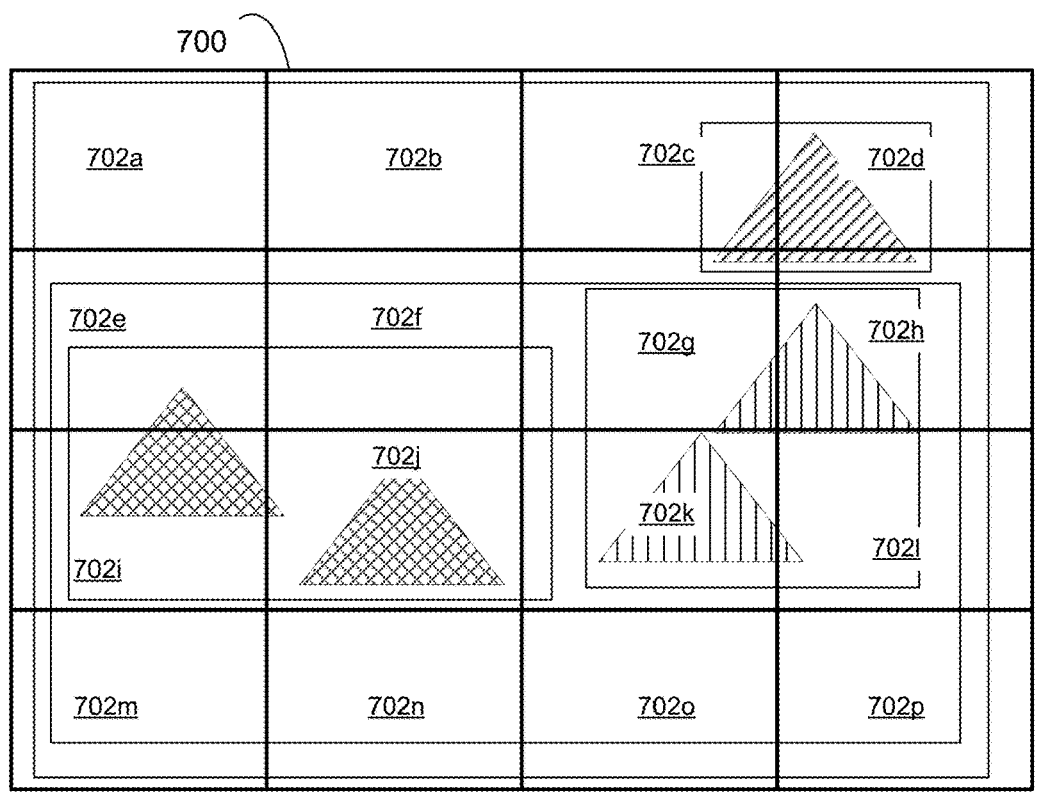
FIGS. 7A, 7B, 7C, 7D, and 7E illustrate examples of a grid map construction process, in accordance with aspects of the present disclosure.

FIG. 7A illustrates an example of a grid map 700 according to aspects of the present disclosure. As shown in FIG. 7A, the scene 600, as described in FIG. 6, is divided into a grid 700. For illustrative purposes, the grid 700 and scene 600 are shown as a two-dimensional grid 700 and scene 600. As described above, the grid 700 and scene 600 may be three-dimensional (3D). Additionally, cells 702a-702p of the grid 700 may have a cell width ($C_w$), cell height ($C_h$), and cell depth ($C_d$) as described above. The grid 700 has a granularity of 4×4.

Figure 7B:
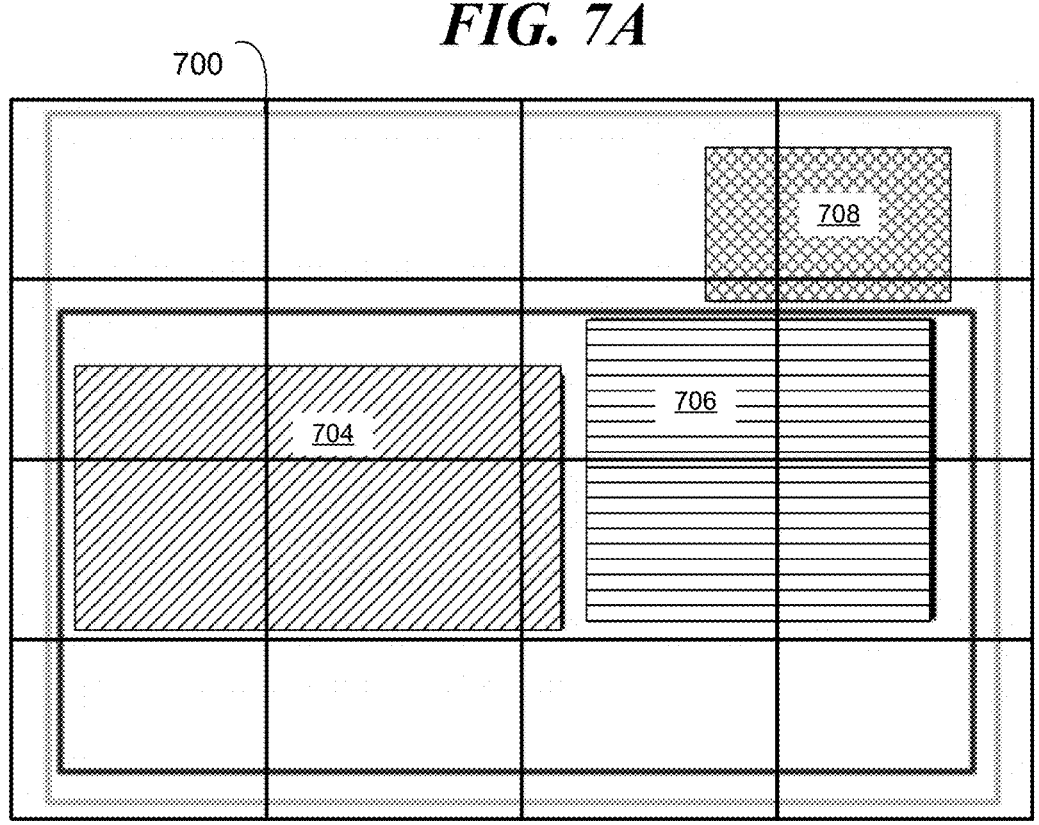
Figure 7C:
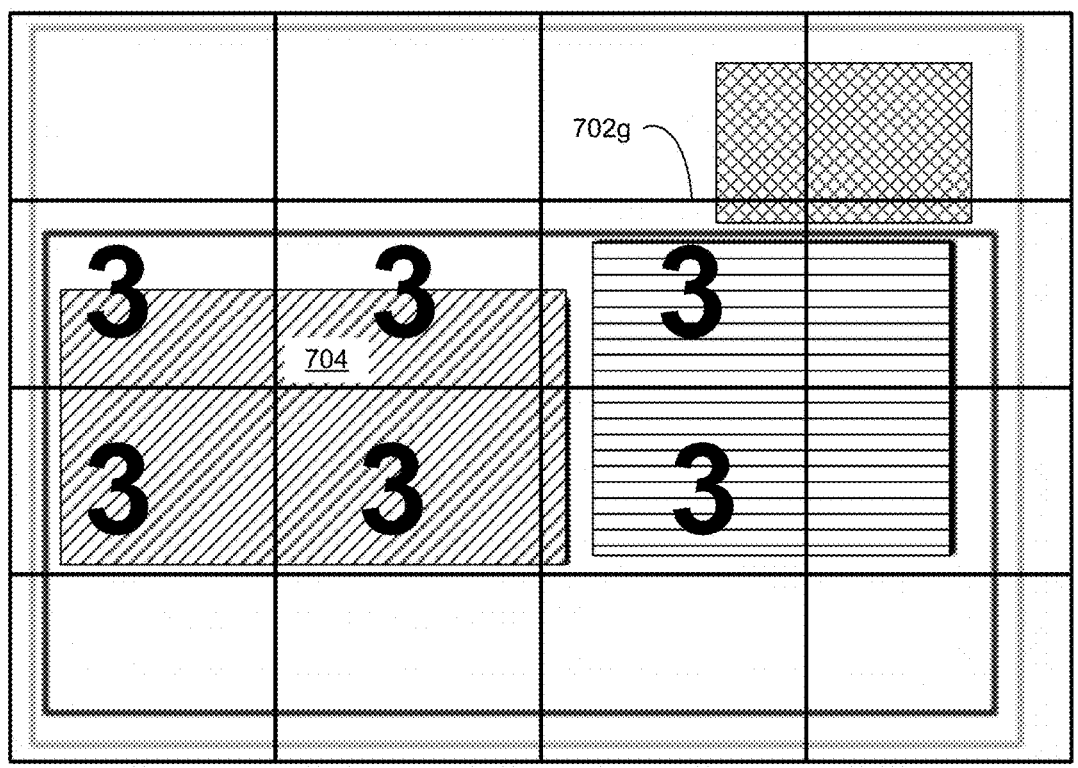

FIG. 7B illustrates an example of the grid map 700 according to aspects of the present disclosure. For illustrative purpose and clarity, the bounding boxes 612, 614, and 618, as described in FIG. 6, are shown as bounding boxes 704, 706, and 708, respectively. FIG. 7C illustrates an example of mapping nodes of a BVH tree 650 to cells 702a-702p of the grid 700 according to aspects of the present disclosure. As described above, the grid map construction process, such as the grid map construction process 500 as described with respect to FIG. 5, traverses the BVH tree 650 in DFS order to map node 652a-652e to the cells 702a-702p of the grid 700. In the current example, the DFS order may begin with the third node 652d or the fourth node 652e.

In the example of FIG. 7C, the third node 652d is first mapped to the cells 702a-702p of the grid 700. As shown in FIG. 7C, the fifth to seventh cells 702e-702g and the ninth to eleventh cells 702i-702k include a portion of the first bounding box 704 corresponding to the third node 652d. Thus, the fifth to seventh cells 702e-702g and the ninth to eleventh cells 702i-702k are associated with the third node 652d. For illustrative purposes, in FIGS. 7C-7E and 9, a number in a cell 702a-702p represents an association of the cell 702a-702p to the node 652a-652e corresponding to the number in the cell 702a-702p. For example, the "3" in the fifth cell 702e represents an association of fifth cell 702e to the third node 652d.

Figure 7D:
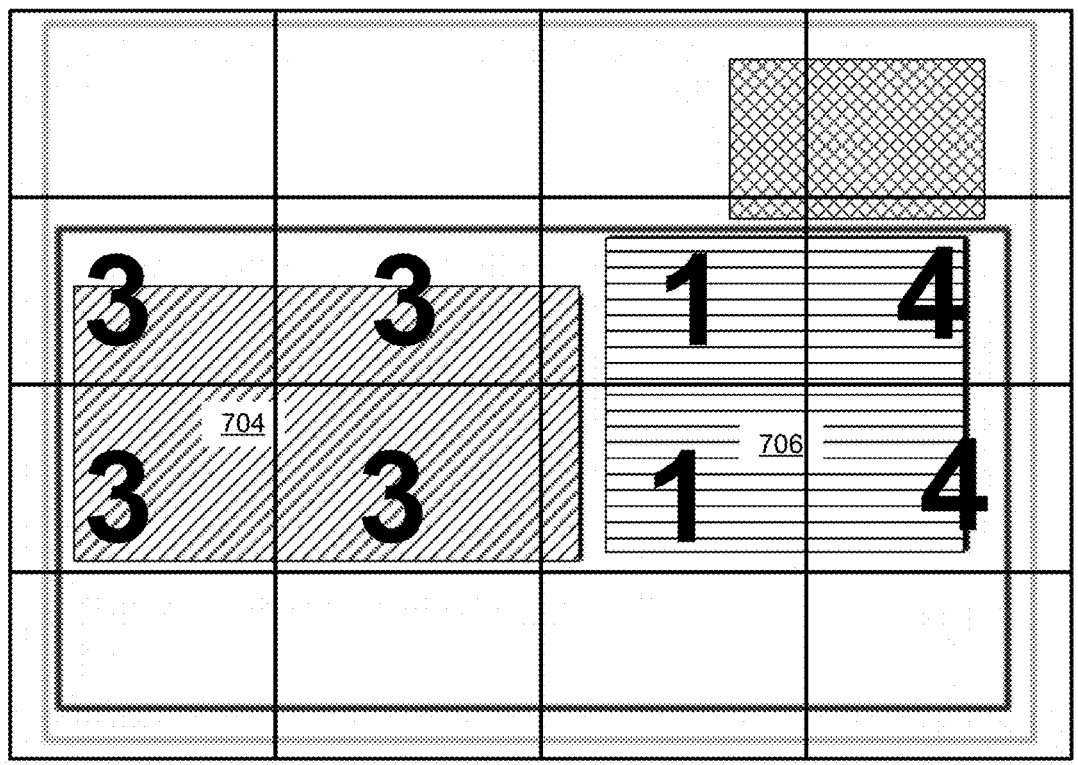

After mapping the third node 652d, the grid map construction process proceeds to mapping the fourth node 652e. FIG. 7D illustrates an example of mapping the fourth node 652e to cells 702a-702p of the grid 700. As shown in FIG. 7D, the seventh cell 702g, eighth cell 702h, eleventh cell 702k, and twelfth cell 702l include a portion of the second bounding box 706 corresponding to the fourth node 652e.

Still, as shown in FIG. 7D, the seventh cell 702g and the eleventh cell 702k also include a portion of the first bounding box 704 corresponding to the third node 652d. As such, the seventh cell 702g and the eleventh cell 702k were previously associated with the third node 652d. Because the third node 652d of the BVH tree 650 is already present in the seventh cell 702g and the eleventh cell 702k, the grid map construction process identifies the least common ancestor of the third node 652d and the fourth node 652e. In this example, as shown in the BVH tree 650 of FIG. 6, the third node 652d and the fourth node 652e are children of the first node 652b. Therefore, the first node 652b is the least common ancestor of the third node 652d and the fourth node 652e. Thus, the seventh cell 702g and the eleventh cell 702k are associated with the first node 652b.

Figure 7E:
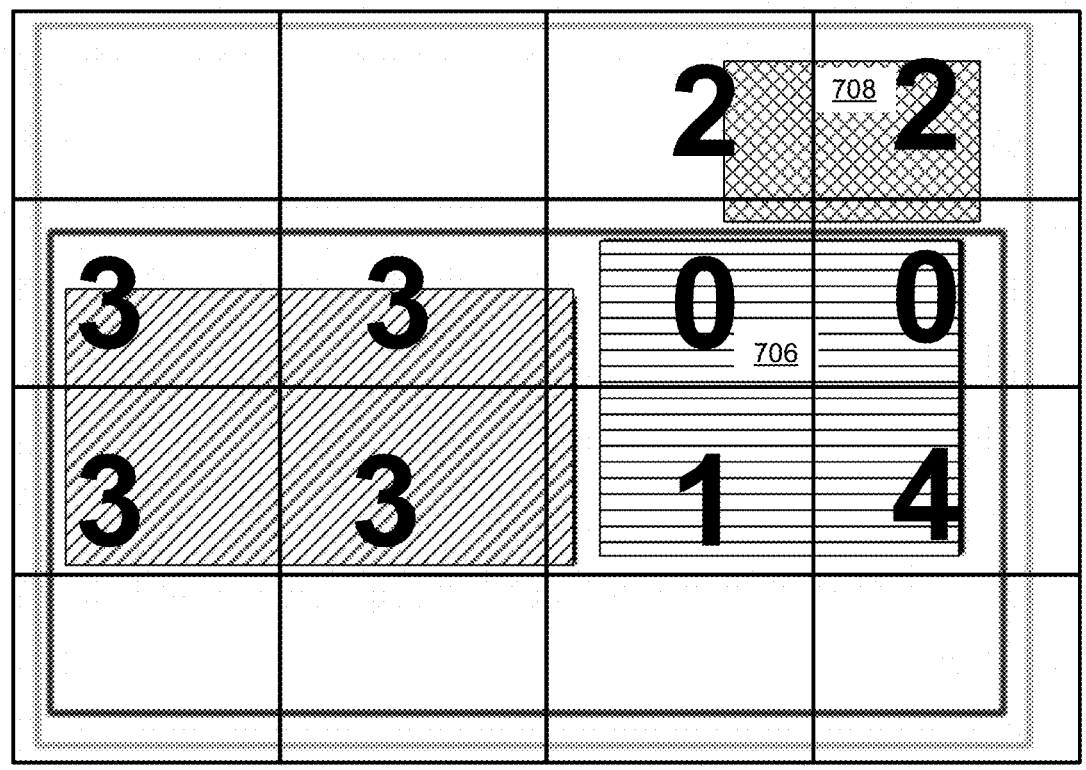

After mapping the fourth node 652e, the grid map construction process proceeds to the second node 652c and the first node 652b. In the current example, the first node 652b has been mapped, thus, the grid map construction process proceeds to mapping the second node 652c. FIG. 7E illustrates the grid map construction process for mapping the second node 652c to cells 702a-702p of the grid 700. As shown in FIG. 7E, the third cell 702c, fourth cell 702d, seventh cell 702g, and eighth cell 702h include a portion of the third bounding box 706. Thus, the third cell 702c and fourth cell 702d are associated with the second node 652c.

Still, as described in FIG. 7E, the seventh cell 702g was associated with the first node 652b and eighth cell 702h was associated with the fourth node 652e. Because the seventh cell 702g and the eighth cell 702h are assigned to the first node 652b and the fourth node 652e of the BVH tree 650, the grid map construction process identifies the least common ancestor of the first node 652b, second node 652c, and the fourth node 652e. In this example, as shown in the BVH tree 650 of FIG. 6, the root node 652a is the least common ancestor of the first node 652b, second node 652c, and fourth node 652e. Thus, the seventh cell 702g and the eighth cell 702h are associated with the first node 652b.

Figure 8:
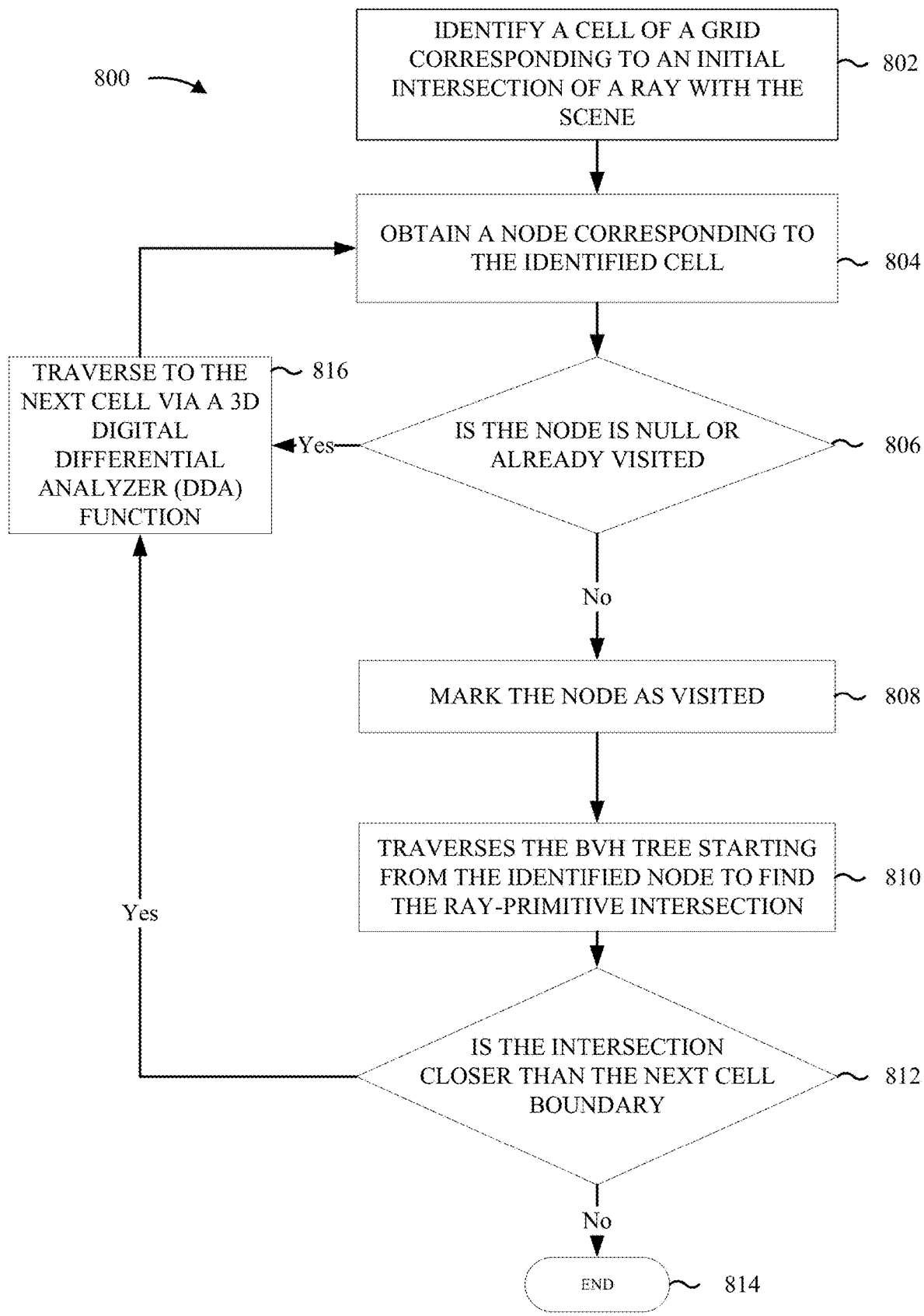
FIG. 8 illustrates a flow diagram for a grid traversal process, in accordance with aspects of the present disclosure.

After completing the grid map construction process, aspects of the present disclosure may initiate a grid traversal process for identifying an initial traversal node of a BVH tree. FIG. 8 illustrates a flow diagram for a grid traversal process 800 according to aspects of the present disclosure. As shown in FIG. 8, at block 802, the process 800 identifies a cell of a grid corresponding to an initial intersection of a ray with the scene, such as the scene 600 as described in FIG. 6. At block 804, the process 800 obtains a node corresponding to the identified cell. At block 806, the process 800 determines if the node is NULL or already visited. A NULL node may refer to an empty cell. That is, the cell is not mapped to a BVH node. If the node is not NULL or has not been visited, the process 800 marks the node as visited (block 808). Additionally, the process 800 traverses the BVH tree starting from the identified node to find the ray-primitive intersection (block 810). At block 812, the process determines if the intersection is closer than the next cell boundary. If the intersection is closer, the process 800 ends at block 814. That is, a ray can intersect multiple primitives in a scene. It is desirable to return details of a primitive details closest to an origin of the ray. In one implementation, at block 814, while traversing the ray, the function returns the current primitive if the current primitive's is smaller than the next cell's boundary's distance.

Alternatively, if the intersection is not closer, the process 800 traverses to the next cell via a 3D digital differential analyzer (DDA) function (block 816). The traversal of the next cell moves the block 804 to repeat the process 800. Additionally, as described, at block 806, the process 800 determines if the node is NULL or already visited. If the node is NULL or has been visited, the process 800 proceeds to traverse to the next cell via a 3D DDA function (block 816).

Figure 9:
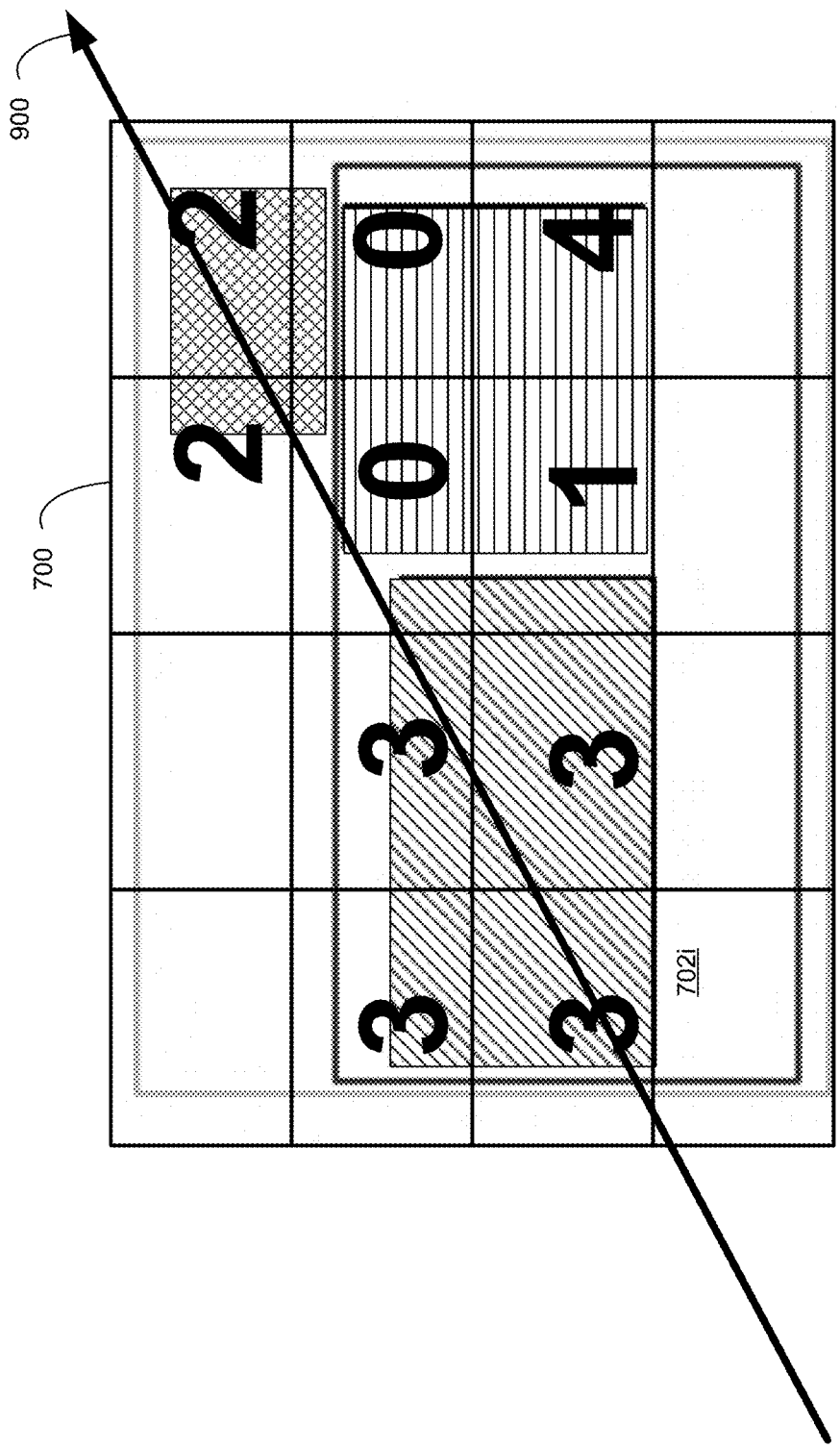
FIGS. 9 and 10 illustrate examples of a grid traversal process, in accordance with aspects of the present disclosure.

FIG. 9 illustrates an example of a grid traversal process according to aspects of the present disclosure. As shown in FIG. 9, a ray 900 intersects the grid 700. The initial intersection location of the ray 900 and the grid 700 corresponds to a location where the ray 900 initially intersects the scene 600. Specifically, an initial intersection of the ray 900 occurs at the ninth cell 702i of the grid 700. Thus, the ninth cell 702i of the grid 700 corresponds to an initial intersection of the ray 900 with the grid 700. As described above and as shown in FIG. 9, the ninth cell 702i corresponds to the third node 652d.

In the example of FIG. 9, the ninth cell 702i is not NULL and has not been previously visited. Therefore, the grid traversal process begins traversing the BVH tree 650 from the third node 652d. That is, the BVH tree 650 traversal may begin at an interior node (e.g., third node 652d) rather than the root node 652a. As described, initiating a BVH traversal at an interior node accelerates the traversal process while reducing the use of system resources.

Figure 10:
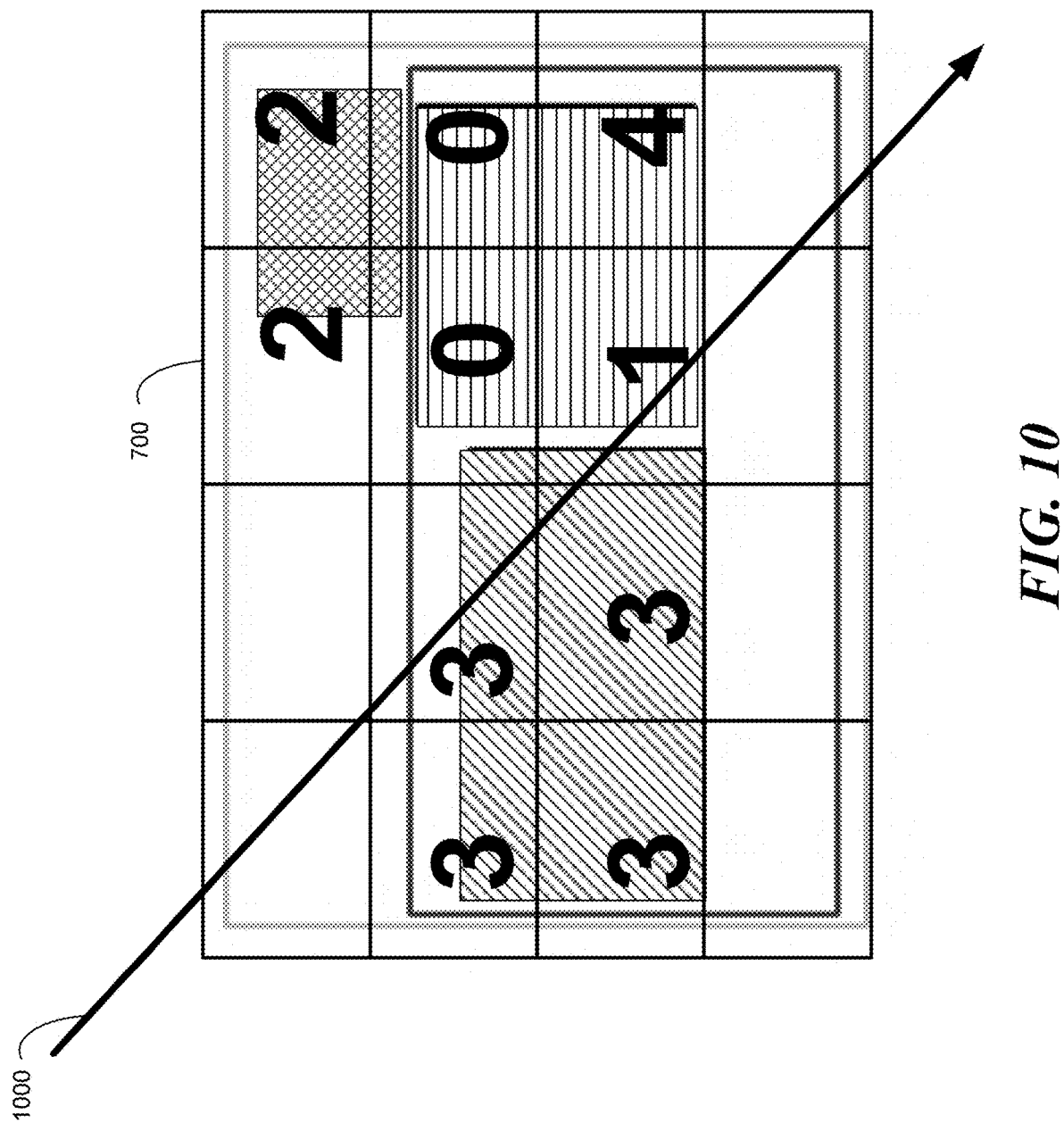

FIG. 10 illustrates an example of a grid traversal process according to aspects of the present disclosure. As shown in FIG. 10, a ray 1000 intersects the grid 700. Specifically, an initial intersection of the ray 1000 occurs at the first cell 702a of the grid 700. Thus, the first cell 702a of the grid 700 corresponds to an initial intersection of the ray 1000 with the grid 700. As described above and as shown in FIG. 10, the first cell 702a does not correspond to a node of the BVH tree 650. That is, the first cell 702a is NULL.

Based on the grid traversal process, such as the grid traversal process 800 described in FIG. 8, if a cell (e.g., node) is NULL, the grid traversal process traverses to a next cell based on a 3D DDA function. According to the 3D DDA function, the grid traversal process proceeds to the second cell 702b. As described above and as shown in FIG. 10, the second cell 702b does not correspond to a node of the BVH tree 650. Thus, the second cell 702b is also NULL.

According to the 3D DDA function, the grid traversal process next proceeds to the sixth cell 702f corresponding to the third node 652c. In the example of FIG. 10, the sixth cell 702f is not NULL and has not been previously visited. Therefore, the grid traversal process begins traversing the BVH tree 650 from the third node 652d.

Figure 11:
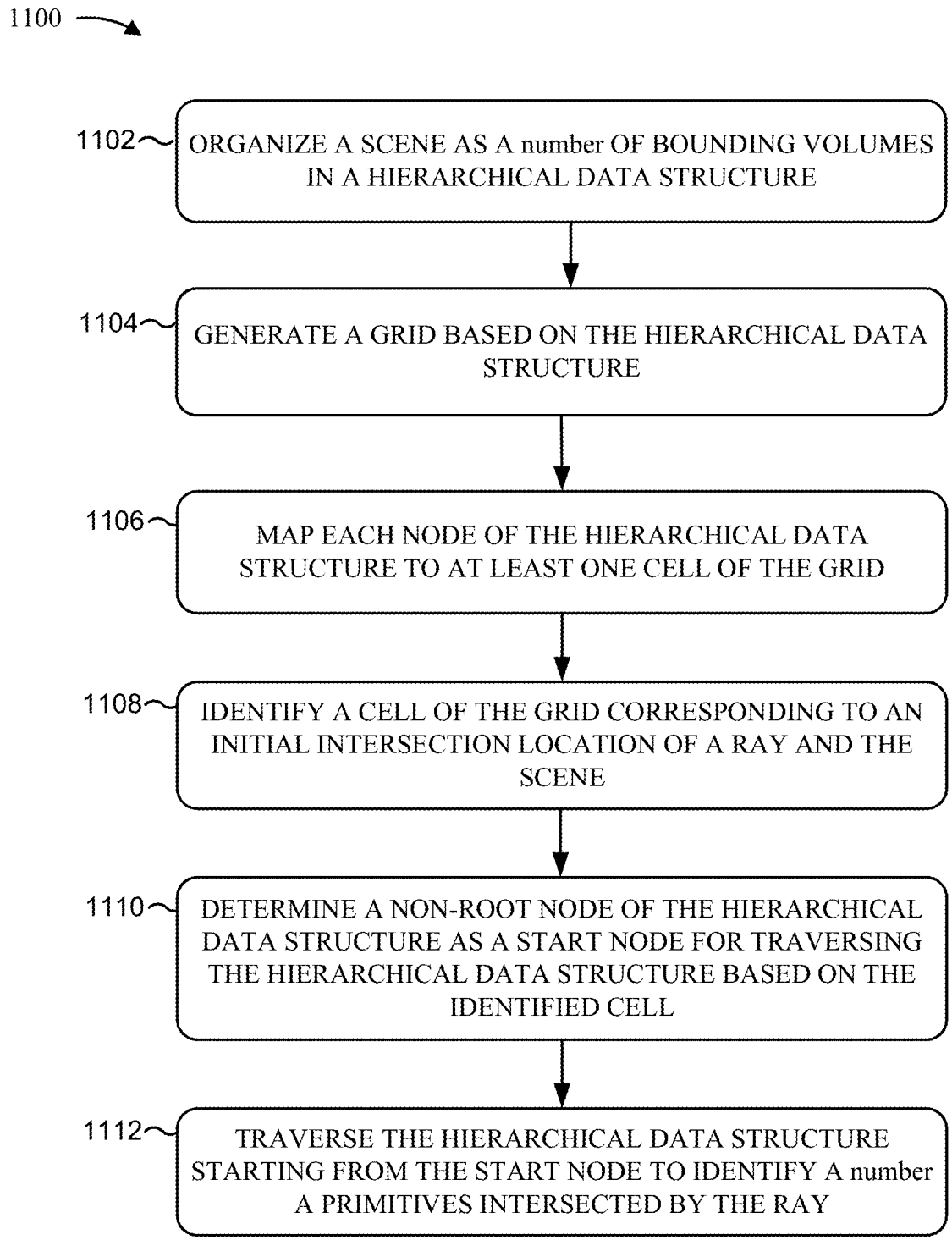
FIG. 11 illustrates a flow diagram for a process, in accordance with aspects of the present disclosure.

FIG. 11 illustrates a flow diagram for a process number according to an aspect of the present disclosure. The example process number is an example of hierarchical data structure traversal using spatial division. The hierarchical data structure may be a bounded volume hierarchy (BVH) tree, such as the BVH tree 650 described with reference to FIG. 6. As shown in FIG. 11, in some aspects, the process number may include organizing a scene as a plurality of bounding volumes in a hierarchical data structure (block 1102).

In some aspects, the process number may include generating a grid based on the hierarchical data structure (block 1104). Dimensions of the grid may be based on dimensions of a root node of the hierarchical data structure. Additionally, the process number may include mapping each node of the hierarchical data structure to at least one cell of the grid (block 1106). As an example, each node may be mapped to a grid cell based on a depth first search of the hierarchical data structure. Nodes may be mapped as described, for example, with respect to FIG. 7. In some implementations, mapping each node may include identifying one or more cells in the grid comprising a portion of a bounding volume corresponding to the node, determining whether the one or more cells is associated with another node, mapping a least one common ancestor of the node and the other node when the one or more cells are associated with the other node, and mapping the node to the one or more cells when the one or more cells are not associated with the other node.

As shown in FIG. 11, in some aspects, the process number may include identifying a cell of the grid corresponding to an initial intersection location of a ray and the scene (block 1108). Furthermore, the process number may include determining a non-root node of the hierarchical data structure as a start node for traversing the hierarchical data structure based on the identified cell (block 1110).

As shown in FIG. 11, in some aspects, the process number may include traversing the hierarchical data structure starting from the start node to identify a plurality a primitives intersected by the ray (block 1112).

The various operations of methods described above may be performed by any suitable means capable of performing the corresponding functions. The means may include various hardware and/or software component(s) and/or module(s), including, but not limited to, a circuit, an application specific integrated circuit (ASIC), or processor. Generally, where there are operations illustrated in the figures, those operations may have corresponding counterpart means-plus-function components with similar numbering.

As used, the term "determining" encompasses a wide variety of actions. For example, "determining" may include calculating, computing, processing, deriving, investigating, looking up (e.g., looking up in a table, a database or another data structure), ascertaining and the like. Additionally, "determining" may include receiving (e.g., receiving information), accessing (e.g., accessing data in a memory) and the like. Furthermore, "determining" may include resolving, selecting, choosing, establishing, and the like.

As used, a phrase referring to "at least one of" a list of items refers to any combination of those items, including single members. As an example, "at least one of: a, b, or c" is intended to cover: a, b, c, a-b, a-c, b-c, and a-b-c.

The various illustrative logical blocks, modules and circuits described in connection with the present disclosure may be implemented or performed with a general-purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, erasable programmable read-only memory (EPROM), electrically erasable programmable read-only memory (EEPROM), registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a device. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement signal processing functions. For certain aspects, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and general processing, including the execution of software stored on the machine-readable media. The processor may be implemented with one or more general-purpose and/or special-purpose processors. Examples include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, random access memory (RAM), flash memory, read only memory (ROM), programmable read-only memory (PROM), erasable programmable read-only memory (EPROM), electrically erasable programmable Read-only memory (EEPROM), registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the device, all which may be accessed by the processor through the bus interface. Alternatively, or in addition, the machine-readable media, or any portion thereof, may be integrated into the processor, such as the case may be with cache and/or general register files. Although the various components discussed may be described as having a specific location, such as a local component, they may also be configured in various ways, such as certain components being configured as part of a distributed computing system.

The processing system may be configured as a general-purpose processing system with one or more microprocessors providing the processor functionality and external memory providing at least a portion of the machine-readable media, all linked together with other supporting circuitry through an external bus architecture. Alternatively, the processing system may comprise one or more neuromorphic processors for implementing the neuron models and models of neural systems described herein. As another alternative, the processing system may be implemented with an application specific integrated circuit (ASIC) with the processor, the bus interface, the user interface, supporting circuitry, and at least a portion of the machine-readable media integrated into a single chip, or with one or more field programmable gate arrays (FPGAs), programmable logic devices (PLDs), controllers, state machines, gated logic, discrete hardware components, or any other suitable circuitry, or any combination of circuits that can perform the various functionality described throughout this disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module. Furthermore, it should be appreciated that aspects of the present disclosure result in improvements to the functioning of the processor, computer, machine, or other system implementing such aspects.

If implemented in software, the functions may be stored or transmitted over as one or more instructions or code on a computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Additionally, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described can be downloaded and/or otherwise obtained by a user terminal and/or base station as applicable. For example, such a device can be coupled to a server to facilitate the transfer of means for performing the methods described herein. Alternatively, various methods described can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described to a device can be utilized.

It is to be understood that the claims are not limited to the precise configuration and components illustrated above. Various modifications, changes, and variations may be made in the arrangement, operation, and details of the methods and apparatus described above without departing from the scope of the claims.

What is claimed is:

1. A method comprising:
   organizing a scene as a plurality of bounding volumes in a hierarchical data structure;
   generating a grid based on the hierarchical data structure;
   mapping each node of the hierarchical data structure to at least one cell of the grid;
   identifying a cell of the grid corresponding to an initial intersection location of a ray and the scene;
   determining a non-root node of the hierarchical data structure as a start node for traversing the hierarchical data structure based on the identified cell; and traversing the hierarchical data structure starting from the start node to identify a plurality of primitives intersected by the ray, traversing the hierarchical data comprising:

traversing to a subsequent cell via a three-dimensional digital differential analyzer (DDA) function when the identified cell is NULL or previously visited; and terminating the traversing via the three-dimensional DDA function based on a distance between a boundary of the identified cell and a boundary of the subsequent cell being greater than a distance to an intersection between the ray and a primitive in the identified cell.

2. The method of claim 1, further comprising mapping each node to a grid cell based on a depth first search of the hierarchical data structure.

3. The method of claim 1, in which mapping each node comprises:

identifying at least one cell in the grid comprising a portion of a bounding volume corresponding to the node;

determining whether the at least one cell is associated with an other node;

mapping a least one common ancestor of the node and the other node when the at least one cell is associated with the other node; and mapping the node to the at least one cell when the at least one cell is not associated with the other node.

4. The method of claim 1, in which the hierarchical data structure comprises a bounded volume hierarchy (BVH) tree.

5. An apparatus for wireless communication, comprising:

a processor;

memory coupled with the processor; and instructions stored in the memory and operable, when executed by the processor, to cause the apparatus:

to organize a scene as a plurality of bounding volumes in a hierarchical data structure;

to generate a grid based on the hierarchical data structure;

to map each node of the hierarchical data structure to at least one cell of the grid;

to identify a cell of the grid corresponding to an initial intersection location of a ray and the scene;

to determine a non-root node of the hierarchical data structure as a start node for traversing the hierarchical data structure based on the identified cell; and to traverse the hierarchical data structure starting from the start node to identify a plurality of primitives intersected by the ray, execution of the instructions that cause the apparatus to traverse the hierarchical data further cause the apparatus:

to traverse to a subsequent cell via a three-dimensional digital differential analyzer (DDA) function when the identified cell is NULL or previously visited; and to terminate the traversing via the three-dimensional DDA function based on a distance between a boundary of the identified cell and a boundary of the subsequent cell being greater than a distance to an intersection between the ray and a primitive in the identified cell.

6. The apparatus of claim 5, in which execution of the instructions further cause the apparatus to map each node to a grid cell based on a depth first search of the hierarchical data structure.

7. The apparatus of claim 5, in which execution of the instructions that cause the apparatus to map each node, further cause the apparatus:

to identify at least one cell in the grid comprising a portion of a bounding volume corresponding to the node;

to determine whether the at least one cell is associated with an other node;

to map a least one common ancestor of the node and the other node when the at least one cell is associated with the other node; and to map the node to the at least one cell when the at least one cell is not associated with the other node.

8. The apparatus of claim 5, in which the hierarchical data structure comprises a bounded volume hierarchy (BVH) tree.

9. A non-transitory computer-readable medium having program code recorded thereon, the program code executed by an apparatus and comprising:

program code to organize a scene as a plurality of bounding volumes in a hierarchical data structure;

program code to generate a grid based on the hierarchical data structure;

program code to map each node of the hierarchical data structure to at least one cell of the grid;

program code to identify a cell of the grid corresponding to an initial intersection location of a ray and the scene;

program code to determine a non-root node of the hierarchical data structure as a start node for traversing the hierarchical data structure based on the identified cell; and program code to traverse the hierarchical data structure starting from the start node to identify a plurality of primitives intersected by the ray, the program code to traverse the hierarchical data further comprising:

program code to traverse to a subsequent cell via a three-dimensional digital differential analyzer (DDA) function when the identified cell is NULL or previously visited; and program code to terminate the traversing via the three-dimensional DDA function based on a distance between a boundary of the identified cell and a boundary of the subsequent cell being greater than a distance to an intersection between the ray and a primitive in the identified cell.

10. The non-transitory computer-readable medium of claim 9, further comprising program code to map each node to a grid cell based on a depth first search of the hierarchical data structure.

11. The non-transitory computer-readable medium of claim 9, in which the program code to map each node comprises:

program code to identify at least one cell in the grid comprising a portion of a bounding volume corresponding to the node;

program code to determine whether the at least one cell is associated with an other node;

program code to map a least one common ancestor of the node and the other node when the at least one cell is associated with the other node; and program code to map the node to the at least one cell when the at least one cell is not associated with the other node.

12. The method of claim 1, in which dimensions of the grid are based on dimensions of a root node of the hierarchical data structure.

13. The apparatus of claim 5, in which dimensions of the grid are based on dimensions of a root node of the hierarchical data structure.

14. The non-transitory computer-readable medium of claim 9, in which dimensions of the grid are based on dimensions of a root node of the hierarchical data structure.

* * * * *